(12) United States Patent
Amouris

(10) Patent No.: US 11,343,817 B2
(45) Date of Patent: May 24, 2022

(54) MULTI-TIER DENSITY-AWARE LOCATION-BASED CHANNEL ASSIGNMENT AND ADAPTIVE POWER CONTROL METHOD FOR MOBILE AD-HOC NETWORKS

(71) Applicant: Konstantinos Amouris, Tinton Falls, NJ (US)

(72) Inventor: Konstantinos Amouris, Tinton Falls, NJ (US)

( * ) Notice: Subject to any disclaimer, the term of this patent is extended or adjusted under 35 U.S.C. 154(b) by 9 days.

(21) Appl. No.: 16/873,200

(22) PCT Filed: Aug. 28, 2018

(86) PCT No.: PCT/US2018/000333
§ 371 (c)(1),
(2) Date: Feb. 25, 2020

(87) PCT Pub. No.: WO2019/045767
PCT Pub. Date: Mar. 7, 2019

(65) Prior Publication Data
US 2020/0196309 A1      Jun. 18, 2020

Related U.S. Application Data

(60) Provisional application No. 62/605,829, filed on Aug. 28, 2017.

(51) Int. Cl.
*H04W 72/04* (2009.01)
*H04B 7/26* (2006.01)
(Continued)

(52) U.S. Cl.
CPC ...... *H04W 72/0446* (2013.01); *H04B 7/2643* (2013.01); *H04W 52/243* (2013.01); *H04W 72/082* (2013.01)

(58) Field of Classification Search
CPC ........... H04W 72/0446; H04W 52/243; H04W 72/082; H04B 7/2643
See application file for complete search history.

(56) References Cited

U.S. PATENT DOCUMENTS 7,082,111 B2    7/2006  Amouris
7,304,963 B2    12/2007 Amouris
(Continued)

OTHER PUBLICATIONS

Javed, M.A., Ngo, D.T., and Khan, J.Y. "Distributed spatial reuse distance control for basic safety messages in SDMA-based VANETs," Vehicular Communications, Jan. 2015, 2, 27-35 Applicant Comment: Applicant considers this particular reference as the closest prior art.
(Continued)

*Primary Examiner* — Huy D Vu
*Assistant Examiner* — Bailor C. Hsu

(57) ABSTRACT

A method, and software application, are disclosed for managing data communication transmissions among a plurality of wireless communication nodes that are configured to communicate using a time division multiple access (TDMA) network that is based upon a TDMA frame including a plurality of timeslots. The method is individually performed by each of the nodes, and comprises the steps of: a) obtaining a plurality of K Channel Assignment Functions (CAFs), wherein: 1) K is an integer greater than or equal to 2, and J is an integer ranging from 0 to K-1, and 2) the J-th CAF from the plurality of K CAFs is in a one-to-one correspondence with a J-th channel set, and a J-th Maximum Transmission Interference Range Function (MTIRF), wherein 2a) the J-th CAF assigns one channel from the J-th channel set to an input set of spatial coordinates (SOSC) identifying an input geographic location, and 2b) the J-th MTIRF assigns a J-th Maximum Transmission Interference Range (MTIR) value to the input SOSC; b) obtaining a set
(Continued)

of network topology metrics (NTMs), wherein each of the NTMs is associated with at least one threshold; c) obtaining one or more measurements for each of the NTMs; d) obtaining a current SOSC identifying the current geographic location of the node performing the method; e) selecting a CAF based, at least in part, on 1) the current SOSC, 2) the one or more measurements for each of the NTMs, and 3) the at least one threshold associated with each of the NTMs; f) selecting a channel from a list of channels comprising the channel assigned to the current SOSC by the selected CAF; g) calculating a transmission power level (TPL) based, at least in part, on the MTIR value assigned to the current SOSC by the MTIRF corresponding to the selected CAF; and, h) transmitting data using the selected channel and the calculated TPL.

28 Claims, 35 Drawing Sheets

(51) Int. Cl.
    *H04W 72/08* (2009.01)
    *H04W 52/24* (2009.01)

(56) References Cited

U.S. PATENT DOCUMENTS

| | | | | |
|---|---|---|---|---|
| 7,826,366 | B2* | 11/2010 | Wu | H04W 72/085 |
| | | | | 370/235 |
| 8,031,664 | B2* | 10/2011 | Kim | H04W 72/02 |
| | | | | 370/464 |
| 8,040,857 | B2* | 10/2011 | Wang | H04W 72/0446 |
| | | | | 455/450 |
| 8,619,634 | B2* | 12/2013 | Meier | H04W 72/082 |
| | | | | 370/408 |
| 8,730,988 | B2* | 5/2014 | Kim | H04W 72/082 |
| | | | | 370/252 |
| 2007/0147248 | A1* | 6/2007 | Kodialam | H04L 41/145 |
| | | | | 370/235 |
| 2008/0108365 | A1* | 5/2008 | Buddhikot | H04W 72/048 |
| | | | | 455/452.1 |
| 2009/0168706 | A1* | 7/2009 | Avonts | H04W 36/06 |
| | | | | 370/329 |
| 2010/0279700 | A1* | 11/2010 | Kim | H04W 16/10 |
| | | | | 455/452.1 |

OTHER PUBLICATIONS

M. Artimy, "Local density estimation and dynamic transmission-range assignment in vehicular ad hoc networks," IEEE Transactions on intelligent Transportation Systems, vol. 8, No. 3, pp. 400-412, Sep. 2007. Applicant Comment: This reference is one of many that articulates the technical motivation for dynamically adjusting the transmission range as a function of local density in a vehicular mobile ad-hoc network.

X. Chen. H. H. Refai and X. MA, "SOMA: On The Suitability for VANET," 2008 3rd International Conference on Information and Communication Technologies: From Theory to Applications, Damascus, 2008, pp. 1-5, doi: 10.1109/ICTTA.2008.4530188. Applicant Comment: This reference illustrates: a) long-felt but unresolved need, b) failure of others, and c) skepticism by experts.

https://patentscope.wipo.int/search/en/detail.jsf?docId=WO2019045767&tab=PCTDOCUMENTS SEARCH and EXAMINATION-RELATED DOCUMENTS a) WO2019045767-SEARCH-HISTORY.pdf, b) WO2019045767-INTL-SEARCH-REPORT.pdf c) WO2019045767-INTL-REPORT-PATENTABILITY.pdf.

* cited by examiner

| TDMA Frame Timeslot to Logical Channel Number (LCN) Mapping Function | | | | |
|---|---|---|---|---|
| t1 | t2 | t3 | t4 | t5 |
| LCN-1 | | | LCN-2A | LCN-2B |
| TERRESTRIAL INTRA-REGION N-HOP BRN | | | EVEN INTER-REGION BR DATA SWAP | ODD INTER-REGION BR DATA SWAP |
| FIG 04: APC for CAF[0], CAF[1] | | | FIG 05: APC for CAF[0], CAF[1] | |
| CAF[0]: FIG 06, FIG 07 | | | CAF[0]: FIG 08 CAF[0]: FIG 09 | CAF[0]: FIG 10 CAF[0]: FIG 11 |
| CAF[1]: FIG 13, FIG 14 | | | CAF[1]: FIG 15 | CAF[1]: FIG 16 |
| CAF[0] + CAF[1]: FIG 21, 22 | | | FIG 23, FIG 24 | FIG 25, FIG 26 |
| ADVANTAGED/AIRBORNE INTRA-REGION K-HOP BRN | | | TERRESTRIAL-ADVANTAGED 2-HOP BRN | |
| | | | CAF[0]: FIG 12 CAF[1]: FIG 17 | |

FIG. 3

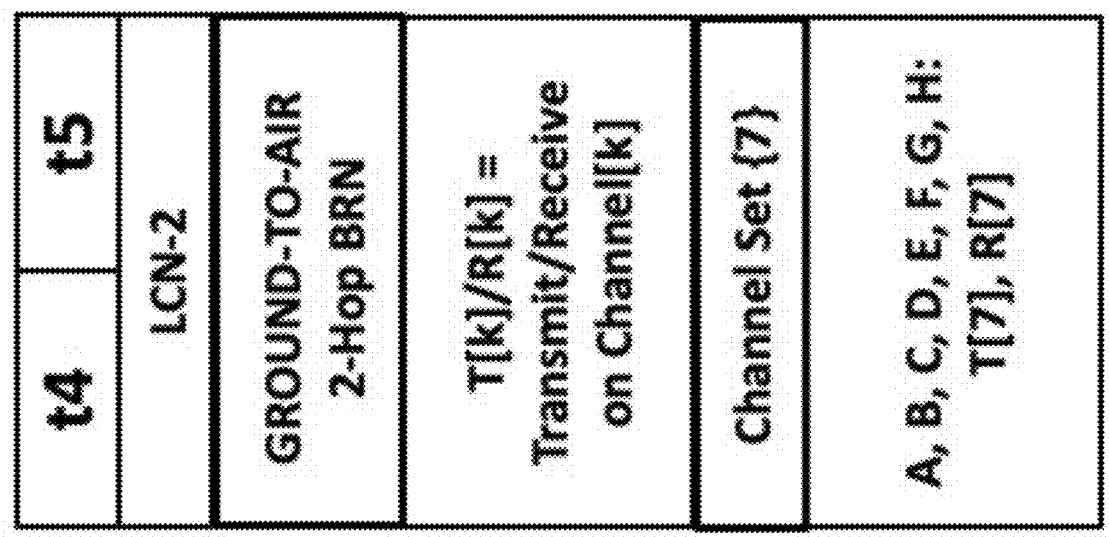
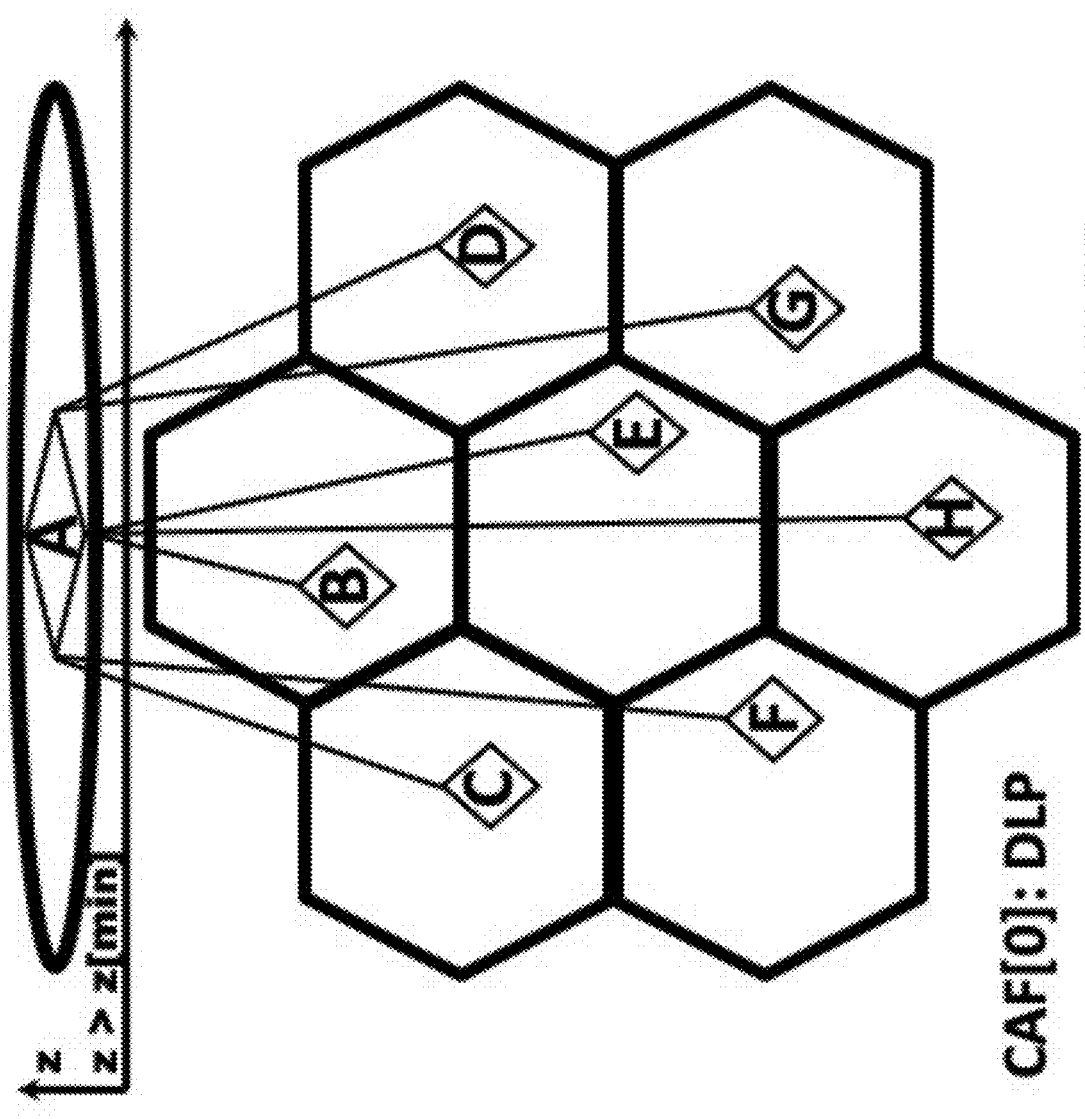
FIG. 12

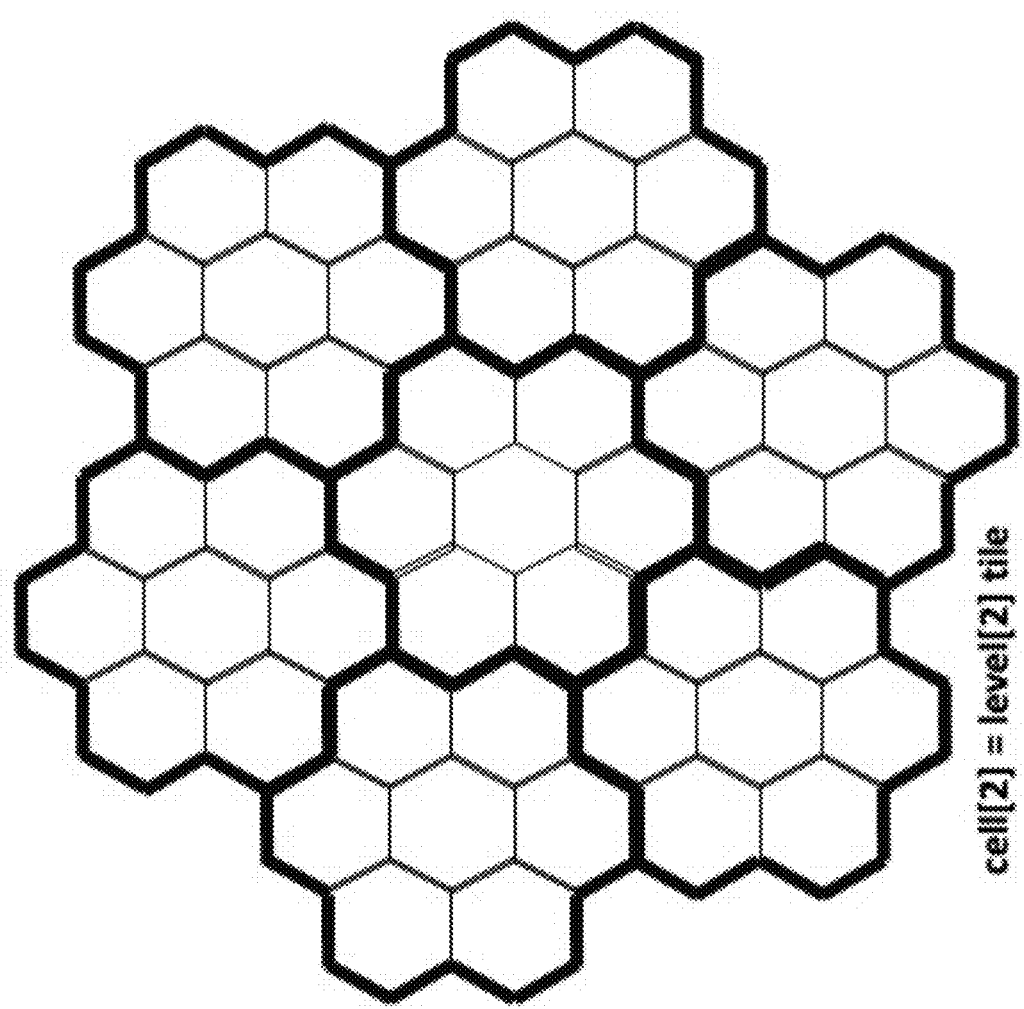
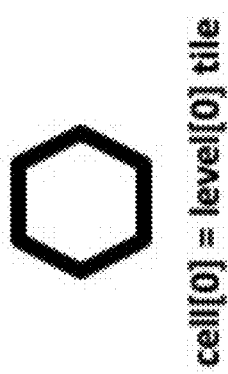
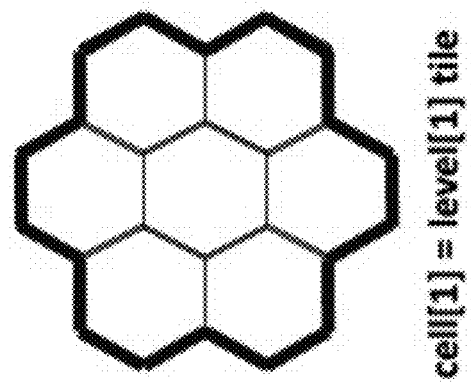
FIG. 34

MULTI-TIER DENSITY-AWARE LOCATION-BASED CHANNEL ASSIGNMENT AND ADAPTIVE POWER CONTROL METHOD FOR MOBILE AD-HOC NETWORKS

CROSS-REFERENCE TO RELATED APPLICATIONS

This application claims priority from U.S. Provisional Patent Application Ser. No. 62/605,829, filed Aug. 28, 2017, titled "Flat/Unified Network Architecture with Cellular Barrage Relay Networks", the entire contents of which are herein incorporated by reference.

TECHNICAL FIELD

The invention relates to the field of mobile ad-hoc networks (MANET), and specifically the invention relates to a multi-tier, density-aware method for dynamically assigning communication channels and forming geographic subnets within a wide-area MANET.

BACKGROUND

U.S. Pat. No. 7,082,111, the contents of which are herein incorporated by reference in their entirety, discloses a method for assigning communication channels to the nodes of a mobile ad-hoc network (MANET), wherein each channel is a unique set of TDMA frame timeslots, and the channel assignment is performed according to a cellular channel assignment function based on each node's instantaneous location.

U.S. Pat. No. 7,304,963, the contents of which are herein incorporated by reference in their entirety, discloses a method for assigning a combination of communication channels and tasks to the nodes of a mobile ad-hoc network (MANET), wherein each channel is a unique FDMA or CDMA channel, and the communication {channel, task} assignment is performed according to a cellular channel assignment function based on each node's instantaneous location.

The limitation of the above channel assignment methods is that they do not work well in MANETs exhibiting significant node density variations throughout their geographic area because the channel assignment function that is used (in both cases) is defined statically (i.e., it is fixed) for the entire MANET geographic area, and as a result, it does not vary in response to the locally observed node density conditions; this limitation causes the channel communication bandwidth to be allocated inefficiently, which is especially problematic for MANETs because wireless communication bandwidth is a very limited resource.

The disclosed method, and software application, presents one possible solution to the above problem by utilizing a multi-tier channel assignment function that is capable of dynamically adapting to the locally observed network density and connectivity conditions.

Furthermore, the disclosed method presents one possible approach for integrating the operation of the dynamic, density-aware, multi-tier channel assignment function with an end-to-end network routing mechanism that is based, in part, on the dynamically formed geographic subnets (i.e., regions) that are produced by the disclosed channel assignment function.

SUMMARY

The present disclosure provides a method, and software application, for managing data communication transmissions among a plurality of wireless communication nodes configured to communicate using a time division multiple access (TDMA) network, where the network is based upon a TDMA frame including a plurality of timeslots, and each of the timeslots is identified by a periodic timeslot sequence identifier (PTSI). The method is individually performed by each of the wireless communication nodes, and comprises the steps of: a) obtaining a plurality of K Channel Assignment Functions (CAFs), wherein: 1) K is an integer greater than or equal to 2, and J is an integer ranging from 0 to K-1, and 2) the J-th CAF from the plurality of K CAFs is in a one-to-one correspondence with a J-th channel set, and a J-th Maximum Transmission Interference Range Function (MTIRF), wherein 2a) the J-th CAF assigns one channel from the J-th channel set to an input set of spatial coordinates (SOSC) identifying an input geographic location, and 2b) the J-th MTIRF assigns a J-th Maximum Transmission Interference Range (MTIR) value to the input SOSC; b) obtaining a set of network topology metrics (NTMs) comprising a network density metric (NDM), where each of the NTMs is associated with at least one threshold; c) obtaining at least one measurement for each of the NTMs; d) obtaining a current SOSC identifying the current geographic location of the individual node performing the method; e) selecting a CAF from the plurality of K CAFs based, at least in part, on 1) the current SOSC, 2) the at least one measurement for each of the NTMs, and 3) the at least one threshold associated with each of the NTMs; f) selecting a channel from a list of channels comprising the channel assigned to the current SOSC by the selected CAF; g) calculating a transmission power level (TPL) based, at least in part, on the MTIR value assigned to the current SOSC by the MTIRF corresponding to the selected CAF; and, h) transmitting data using the selected channel and the calculated TPL.

BRIEF DESCRIPTION OF THE DRAWINGS

The presently disclosed method and software application are described below in greater detail with reference to the accompanying drawings, in which:

FIG. 3 is a top-view, 'master' figure summarizing the network communication tasks occurring in accordance with an embodiment of the disclosed method.

FIG. 34 illustrates a hierarchical geographic tiling pattern based on the tessellation properties of the hexagonal cell.

DETAILED DESCRIPTION

Figure 1:
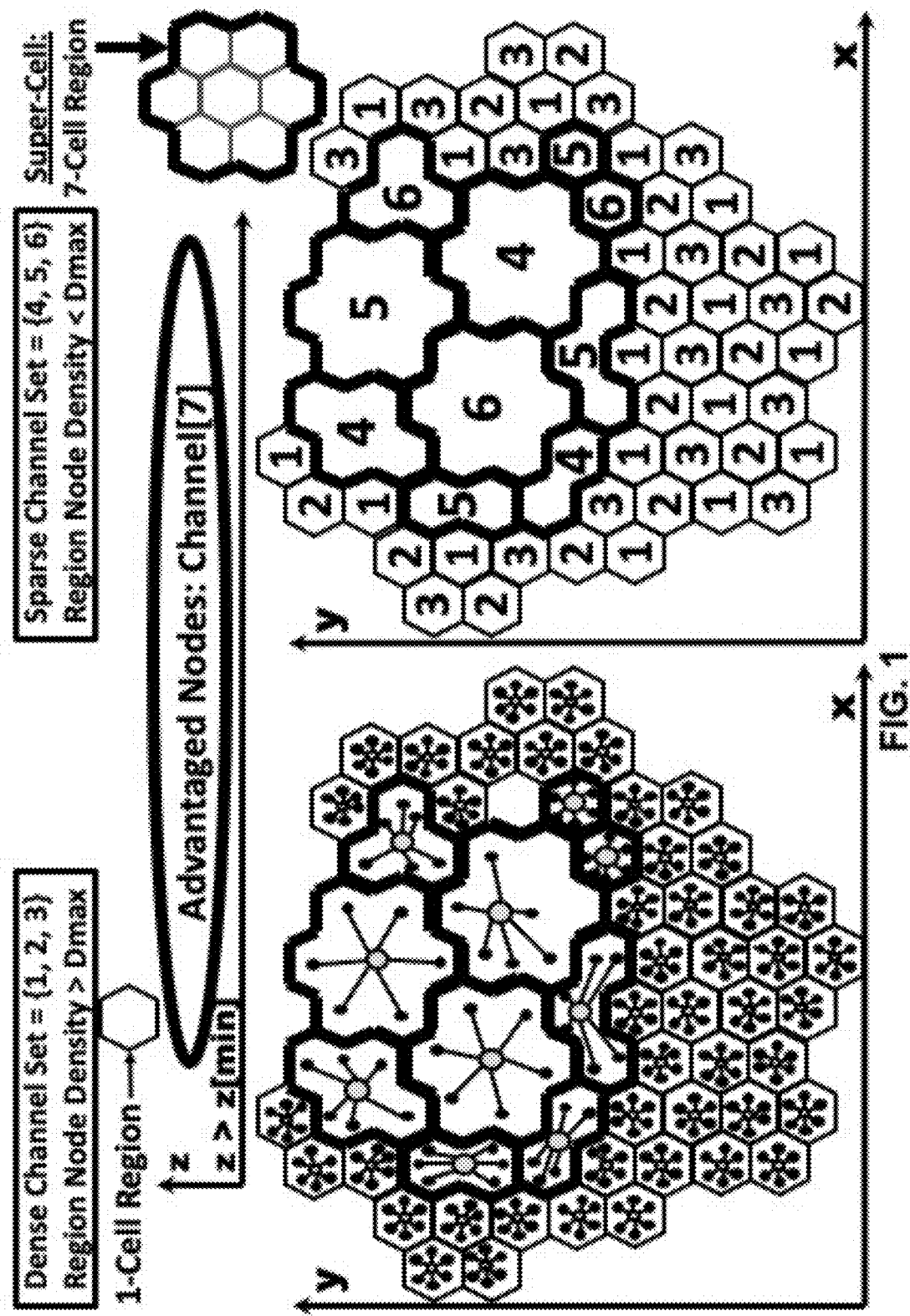
FIG. 1 is an illustration of an example geographic region formation and channel assignment resulting from using a multi-tier, density-aware location-based channel assignment function performed in accordance with an embodiment of the disclosed method.

This application claims the benefit of U.S. Provisional Patent Application Ser. No. 62/605,829 filed on Aug. 28, 2017, the entire disclosure of which is herein incorporated by reference.

In the following discussion of the disclosed method, and software application, a number of terms, acronyms, and abbreviations are used, which are listed here for convenience of reference.

Communication Channel (hereinafter "channel"): A discrete, uniquely identifiable unit/share of communication bandwidth resource including, but not limited to: a) a set of timeslots from a TDMA frame, b) a Frequency Division Multiple Access (FDMA) channel, c) a Code Division Multiple Access (CDMA) channel, or d) a unique pseudo-random frequency-hopping sequence instructing the node to switch to a particular frequency channel at a particular TDMA timeslot. In the presented embodiment, the channels are FDMA channels.

Cell: The smallest geographical area unit that can be assigned a channel.

Region: A contiguous geographical area consisting of multiple adjacent cells that are using the same channel.

CAF: Channel Assignment Function

DLP: Dense Low-Power

SHP: Sparse High-Power

Barrage Relay (BR): The coordinated simultaneous flooding of an identical data packet by multiple nodes belonging to the same region.

Barrage Relay Network (BRN): A collection of nodes within a region using the BR mechanism to flood data packets to the entire region population. It should be noted that the terms 'Network' and 'Region' are interchangeable in this limited context, i.e., a Barrage Relay Network is also a Barrage Relay Region, and vice versa.

Transmission Interference Range (TIR): The distance away from a first transmitter within which a first transmission from the first transmitter can interfere with the ability of a receiver to receive a second transmission originated by a second transmitter.

APC (Adaptive Power Control): a technique used to regulate the transmission power level so that a given transmission will not interfere beyond a predetermined geographic distance from the transmission source.

Network Controller (NC): A node that is elected through a distributed process to act as the central channel access coordinator for all the channel access requests originated from every node in the network (region).

Designated Router (DR): A node that is elected trough a distributed process to aggregate network/region membership information and generate packets advertising the aggregated region membership information. In this embodiment, the NC node also acts as the DR node.

Hop: Indicates a transmission hop, which is a measure of the geographical distance covered by the transmission of a data packet by a single transmitter.

Network Diameter (ND): The maximum number of transmission hops required for a data packet originated by any one node in the network/region to reach every other node in the network/region.

ETE: End-to-End, as in 'The ND is the maximum ETE hop distance between any 2 nodes in the network'.

MAC: Medium Access Control. The MAC mechanism regulates access to a common channel shared by multiple nodes.

Node: A computing device equipped with at least one Radio Frequency (RF) transceiver (i.e., transmitter and receiver pair), comprising at least one processor and non-transitory memory for storing software instructions.

Advantaged Node: A node having significantly elevated altitude relative to the other nodes in the region such that its transmissions can interfere with transmissions from neighbor regions.

TIREM (Terrain Integrated Rough Earth Model): TIREM is a widely used signal propagation loss model that is used to estimate the signal power loss, for a given transmission power level and other transmitter/receiver parameters, incurred by a hypothetically transmitted signal originating at a particular sending location and being received at a particular receiving location.

TRPS (Transmitter/Receiver Pool Selection/Splitting): TRPS is an algorithm used to determine which nodes in a particular region will be transmitters (i.e., the inter-region transmitter pool), and which nodes will be receivers (i.e., the inter-region receiver pool) and which channel each receiver in the receiver pool will receive on.

PLI: Position Location Information.

ALSU (Abstracted Link State Update): A network maintenance control packet containing abstracted node reachability information for a set of nodes containing both intra-region and inter-region nodes. It is called 'abstracted' because the reachability information does not provide any detailed information about any of the intermediate links that contribute to the final reachability picture.

OSPF: Open Shortest Path First

LCN (Logical Channel Number): A set of timeslots characterized by their unique location within a recurring TDMA frame having a predetermined frame length (in timeslots). For the following discussion, the TDMA frame length is 5, LCN-1 consists of the first 3 timeslots in each frame (i.e., t1, t2, and t3), and LCN-2 consists of the last 2 timeslots in each frame (i.e., t4, t5).

TDMA (Frame) Epoch: A subset of an LCN timeslot set which contains LCN timeslots belonging to one single frame. So, if we define the LCN-1 epoch as a timeslot set consisting of timeslots t1, t2, and t3, and the LCN-2 epoch as a timeslot set consisting of timeslots t4, and t5, then LCN-1 is the sum of all the LCN-1 epochs, and LCN-2 is the sum of all the LCN-2 epochs.

CRA (Cell Reception Area): The geographic area that falls within the MTIR of a transmitter pool from one of the neighboring tier[0] CAF regions. Since a level[0] cell is surrounded by 6 neighbor cells, each receiving cell will have 6 different CRAs.

SRA (Super-Cell Reception Area): The geographic area that falls within the MTIR of a transmitter pool from one of the neighboring tier[1] CAF regions. Since a level[1] super-cell is surrounded by 6 neighbor super-cells, each receiving super-cell will have 6 different SRAs.

CRP (Cell Reception Pattern): A set of non-overlapping CRAs that covers the entire cell area. For the presented embodiment, we can have two different CRPs: an even CRP consisting of the 3 even-oriented CRAs (i.e., cell sides 0, 2, 4), and an odd CRP consisting of the 3 odd-oriented CRAs (i.e., cell sides 1, 3, 5).

SRP (Super-Cell Reception Pattern): A set of non-overlapping SRAs that covers the entire super-cell area. For the presented embodiment, we can have two different SRPs: an even SRP consisting of the 3 even-oriented SRAs (i.e., super-cell sides 0, 2, 4), and an odd SRP consisting of the 3 odd-oriented SRAs (i.e., super-cell sides 1, 3, 5).

FIG. 1 is an illustration of a possible geographic region formation and channel assignment that result from using a multi-tier, density-aware location-based channel assignment function performed in accordance with an embodiment of the disclosed method.

Figure 2:
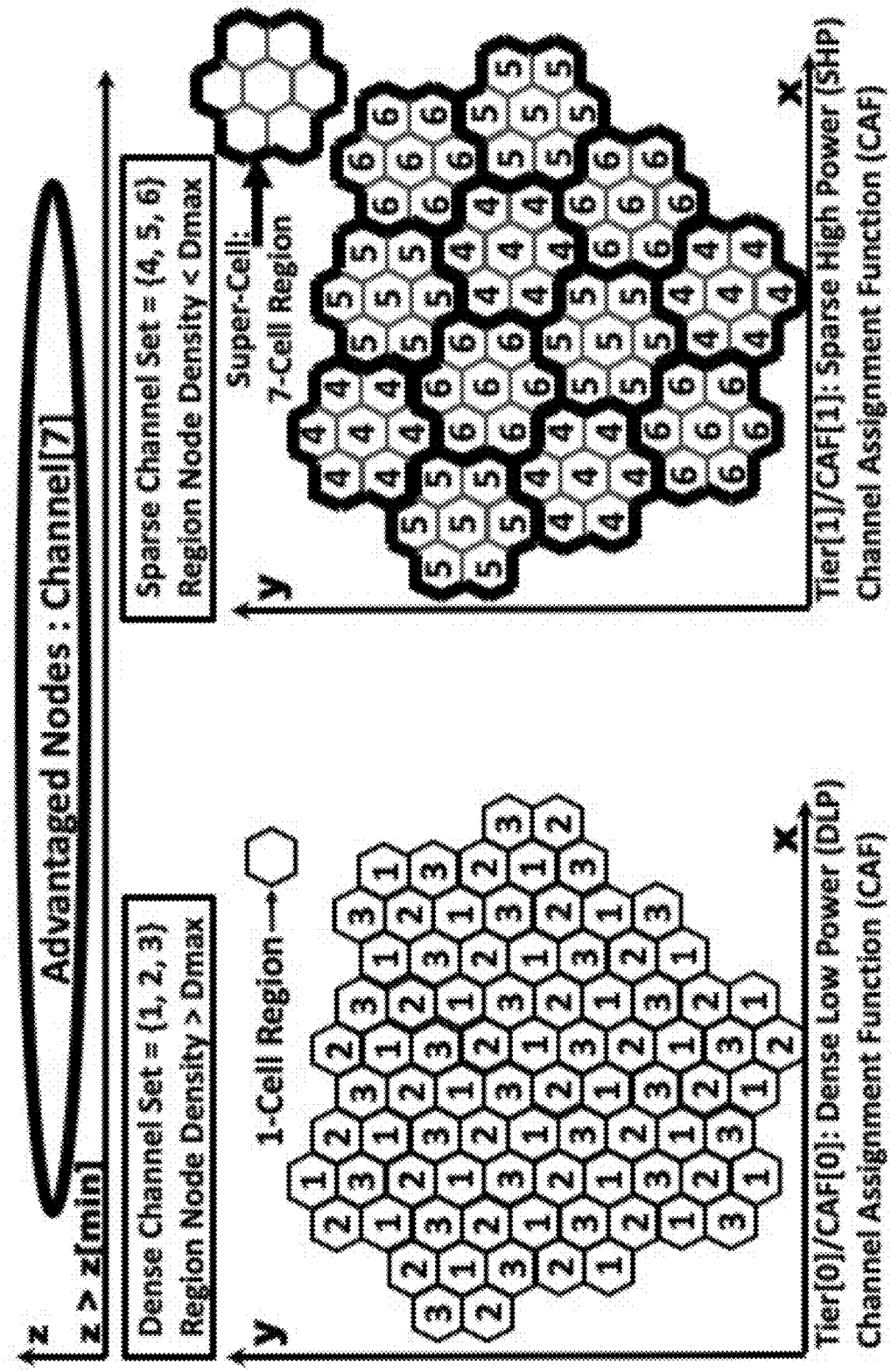
FIG. 2 is an illustration of a dual-tier, density-based, cellular channel assignment function in accordance with an embodiment of the disclosed method.

FIG. 2 is an illustration of a dual-tier, density-based, cellular channel assignment function in accordance with an embodiment of the disclosed method. With reference to FIG. 2, each cellular CAF (i.e., channel assignment tier) is associated with its own set of channels, transmission power levels, and logic conditions that need to be fulfilled in order for a node to use said each CAF. CAF[0] assigns channels 1-3 (i.e., the 'dense' channel set) at the single cell level (i.e., level[0] tile); CAF[1] assigns channels 4-6 (i.e., the 'sparse' channel set) at a 7-cell cluster level (i.e., level[1] tile, or super-cell).

With continuing reference to FIG. 2, it can be seen that the level[1] tile that is indefinitely replicated in space by CAF[1] is produced by taking 6 level[0] tiles and placing them around a 'center' level[0] tile (i.e., placing one level[0] tile on each of the sides of the center level[0] tile); this tile clustering pattern can be recursively applied for any number k>1, producing an array of cellular CAFs (i.e., CAF[0], CAF[1], CAF[2], CAF[k]) wherein the level-k tile that is indefinitely replicated in space by CAF[k] is produced by taking 6 level[k−1] tiles and placing them around a 'center' level[k−1] tile (i.e., placing one level[k−1] tile on each of the sides of the center level[k−1] tile). In accordance with the 'region' definition provided before, since each tile is assigned its own channel, tiles are essentially the basic building blocks of regions, with level[0] tiles (i.e., single cells) being the smallest geographical area unit that can be assigned a channel.

Cellular channel assignment requires that every node is capable of obtaining its instantaneous geo-location (i.e., spatial coordinates); this can be accomplished with the presence of a number of different geo-location systems (such as GPS) and techniques (such as signal trilateration, inertial navigation systems, etc.), working either alone, or in combination.

FIG. 3 is a top-view, 'master' figure summarizing the network communication tasks occurring in accordance with an embodiment of the disclosed method. FIG. 3 defines a TDMA frame timeslot function that maps each timeslot in the TDMA frame to a particular timeslot set, wherein each timeslot set is associated with a particular communication function, and a particular set of neighbor nodes with which to perform said particular communication function. FIG. 3 is effectively a high-level 'master' figure that summarizes the entire operation of the disclosed method by appropriately 'pointing' to the lower-level 'subordinate' figures describing how each of the particular communication tasks contributing to the operation of the method are accomplished.

With continuing reference to FIG. 3, the TDMA frame is split into a fixed size Intra-Region epoch Logical Channel Number (LCN-1: timeslots t1, t2, t3), and a fixed size Inter-Region epoch (slots t4, t5); LCN-1 consists of all the intra-region frame epochs, and facilitates multi-hop communications between nodes within the same terrestrial (or advantaged) region, while LCN-2 consists of all the inter-region frame epochs, and facilitates single-hop communications between nodes belonging to different (neighbor) regions, as well as multi-hop communications between terrestrial nodes and 'advantaged' nodes (i.e., nodes that are significantly elevated with respect to the majority of the node population such that their transmissions are disruptive to the cellular channel reuse pattern 'enforced' by the cellular CAFs).

Figure 4:
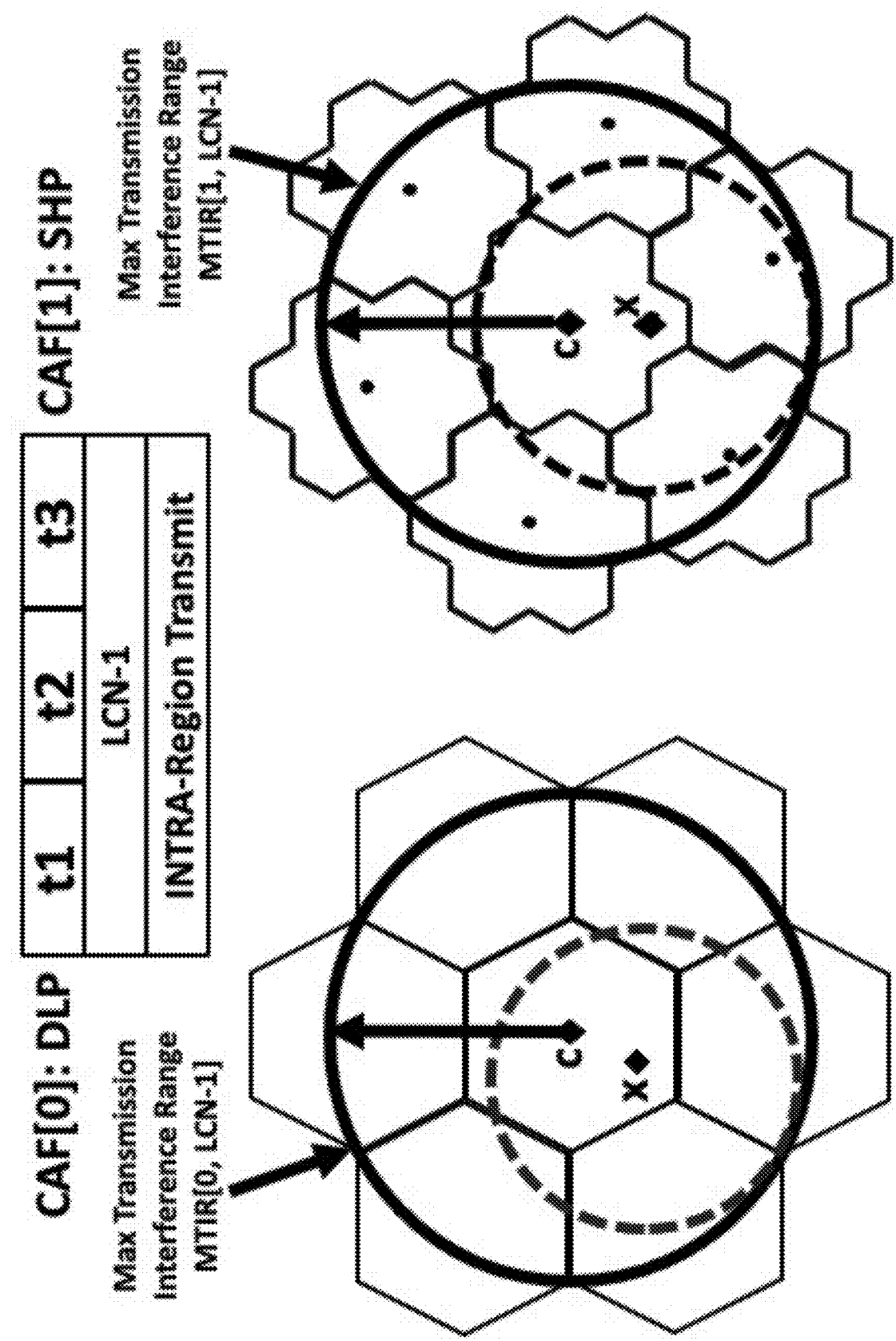
FIG. 4, and FIG. 5 illustrate the intra-region, and inter-region operation, respectively, of the location-based Adaptive Power Control (APC) mechanism in accordance with an embodiment of the disclosed method.
Figure 5:
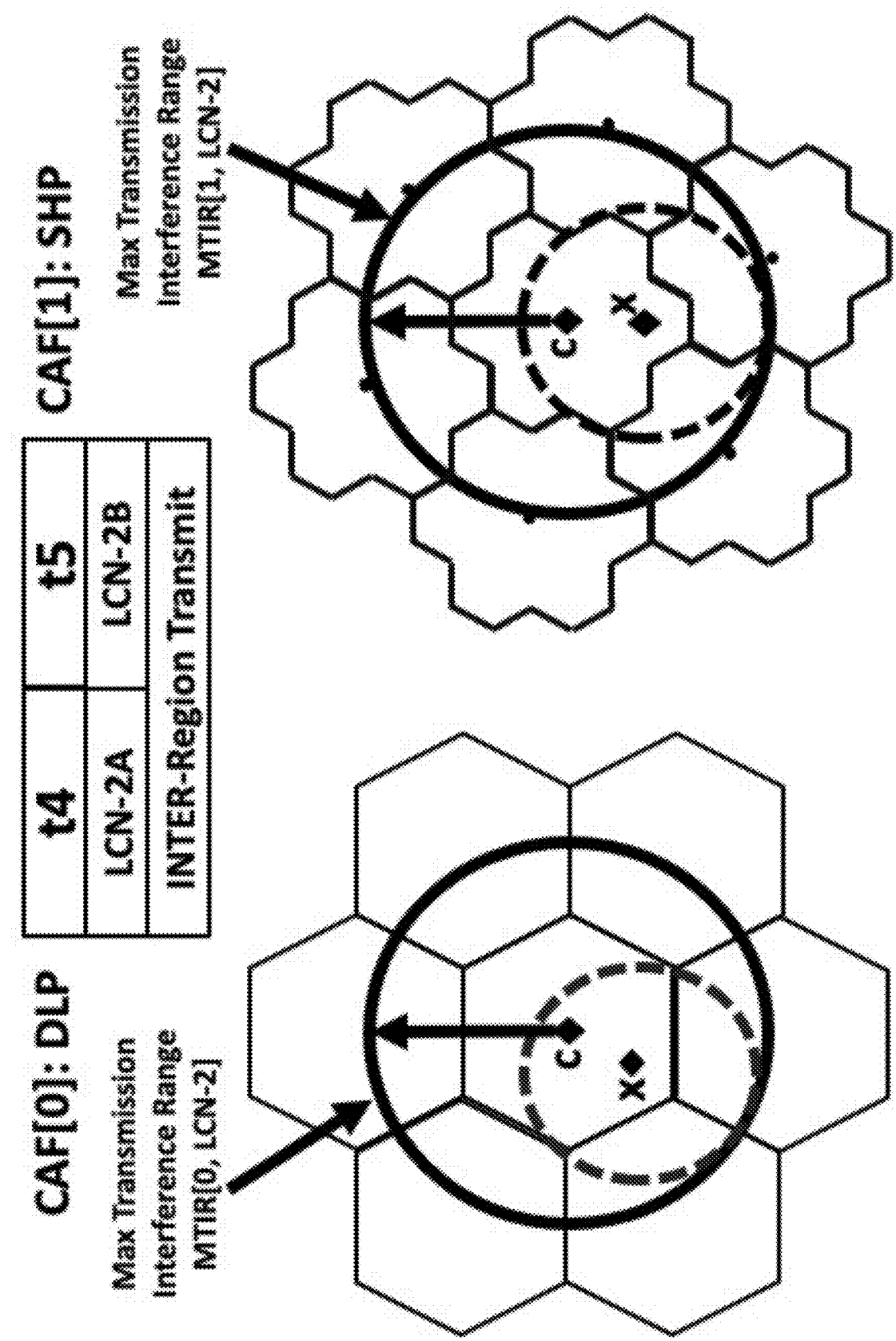

FIG. 4, and FIG. 5 illustrate the intra-region, and inter-region operation, respectively, of the location-based Adaptive Power Control (APC) mechanism in accordance with an embodiment of the disclosed method. APC is used in both TDMA frame LCN types (i.e., Intra-Region and Inter-Region) to ensure that nodes receiving in either TDMA LCN type are within transmission range of transmitters belonging to one, and only one, transmitter pool; in other words, APC ensures that, at any given time slot, a receiving node will only receive and decode a single data packet. The transmit power level used by a transmitter at any given time slot and location is a function of the following:

a) The CAF used by the transmitter (i.e., DLP CAF[0], or SHP CAF[1]);
b) The distance of the transmitter from the center of his level[0] tile (i.e., cell), or his level[1] tile (i.e., super-cell), based on which CAF (i.e., 0 or 1) is used by the transmitter;
c) The current TDMA slot type (i.e., Intra-Region or Inter-Region) during which the transmitter is transmitting; and
d) The Maximum Transmission Interference Range (MTIR) corresponding to: 1) the CAF used by the transmitter, and 2) the TDMA slot type (i.e., LCN-1 or LCN-2) of the timeslot used for the transmission.

The above rules make sure that simultaneous transmissions from multiple transmitters will not reach the same receivers, causing collisions between different packet transmissions.

With continuing reference to FIGS. 4 and 5, and in accordance with the 'Middle-Out' APC technique, transmitter power is adapted based on, at least, the geographical distance of the transmitter (x) from the center (c) of the level[k] CAF tile that the transmitter is currently using, so that the effective transmission interference range will never exceed a predetermined Maximum Transmission Interference Range (MTIR) value. In essence, the MTIR value ensures that the transmission power level is calculated subject to the constraint that the interfering signal power arriving at any receiver located outside the MTIR is less than some predetermined maximum 'noise' level, in order to minimize (or eliminate) 'same-channel' interference at distant receivers that are (re)using the same channel as the transmitter (x).

It should be noted that, in addition to the geographic location of the transmitter with respect to the middle of the tile associated with the particular CAF currently used by the transmitter, additional data and techniques can be used to more accurately inform the selection of the appropriate transmission power level. For example, nodes could have the TIREM (Terrain Integrated Rough Earth Model) signal propagation tool installed in their memory and periodically download the DTED (Digital Terrain Elevation Data) map data corresponding to the broad geographic area in which they are currently located, and then call/execute the TIREM signal propagation tool (using his current geo-location and the points located on the MTIR circle) in order to more accurately estimate the power loss (i.e., 'path loss') that will be imposed by the intervening terrain on the transmitted signal; once a path loss value corresponding to the input set of locations is obtained, then the transmitter can input that path loss value into a link-budget calculation formula and determine the transmission power level that should be used for the node's current transmissions.

In general, APC will cause transmitter power to decrease proportionally to the distance of the transmitter from the middle/center of his CAF tile; therefore, transmitters located closer to (further out from) the middle of their CAF tile transmit at higher (lower) power levels, such that their effective transmission interference range never exceeds the particular MTIR being used based on the LCN type; consequently, if a BR transmission wave starts near the corner of the cell, the source will have to use a lower transmission power level, but the relays closer to the middle of the cell/region may use a higher power level, such that the effective region ND is kept low.

Also, it should be noted that the MTIR value used during LCN-1 (intra-region transmissions) is greater than the MTIR value used during LCN-2 (inter-region transmissions); the reason for that is because, during LCN-2, the nodes in a region are simultaneously receiving data from multiple neighbor regions; therefore, the MTIR for inter-region transmissions needs to be smaller so that the simultaneous neighboring transmissions will not interfere with each other.

Nodes having significant elevation (i.e., $z>z[min]$) lose the ability to adapt their transmission power level such that the MTIR is not exceeded; these nodes are called 'advantaged' or 'disruptive' because they have connectivity to nodes in multiple regions and their transmissions disrupt the 'terrestrial' channel reuse pattern; for that reason, 'advantaged' nodes use a separate channel (i.e., channel 7) which is allocated for communications between advantaged nodes, or between advantaged nodes and terrestrial nodes.

Figure 6:
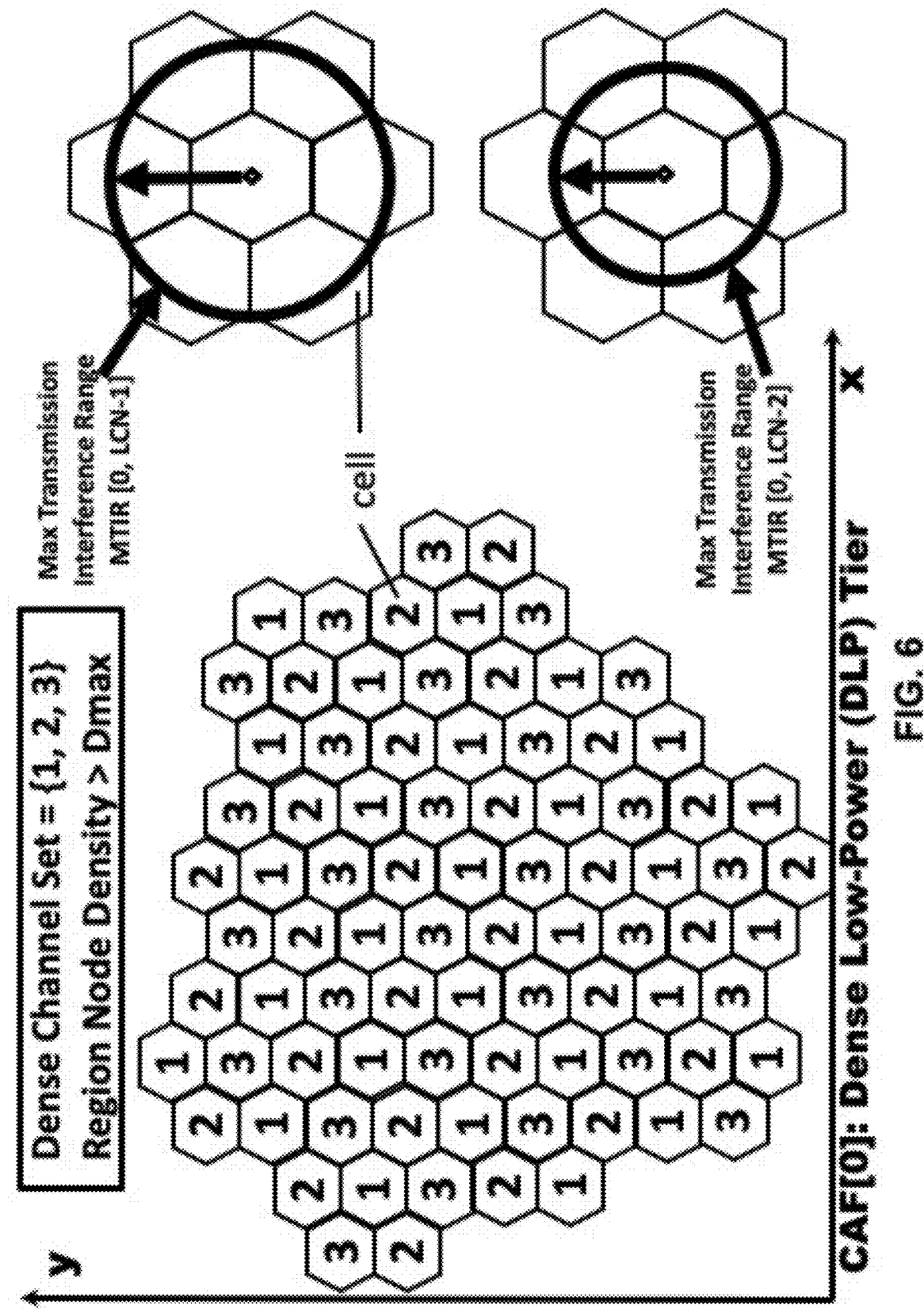
FIG. 6 illustrates the lower-tier Channel Assignment Function (CAF), and the associated channel set, logic condition(s), and Maximum Transmission Interference Range (MTIR) for LCN-1/LCN-2, in accordance with an embodiment of the disclosed method.

FIG. 6 illustrates the lower-tier Channel Assignment Function (CAF), and the associated channel set, logic condition(s), and Maximum Transmission Interference Range (MTIR) for LCN-1/LCN-2, In accordance with an embodiment of the disclosed method.

Figure 7:
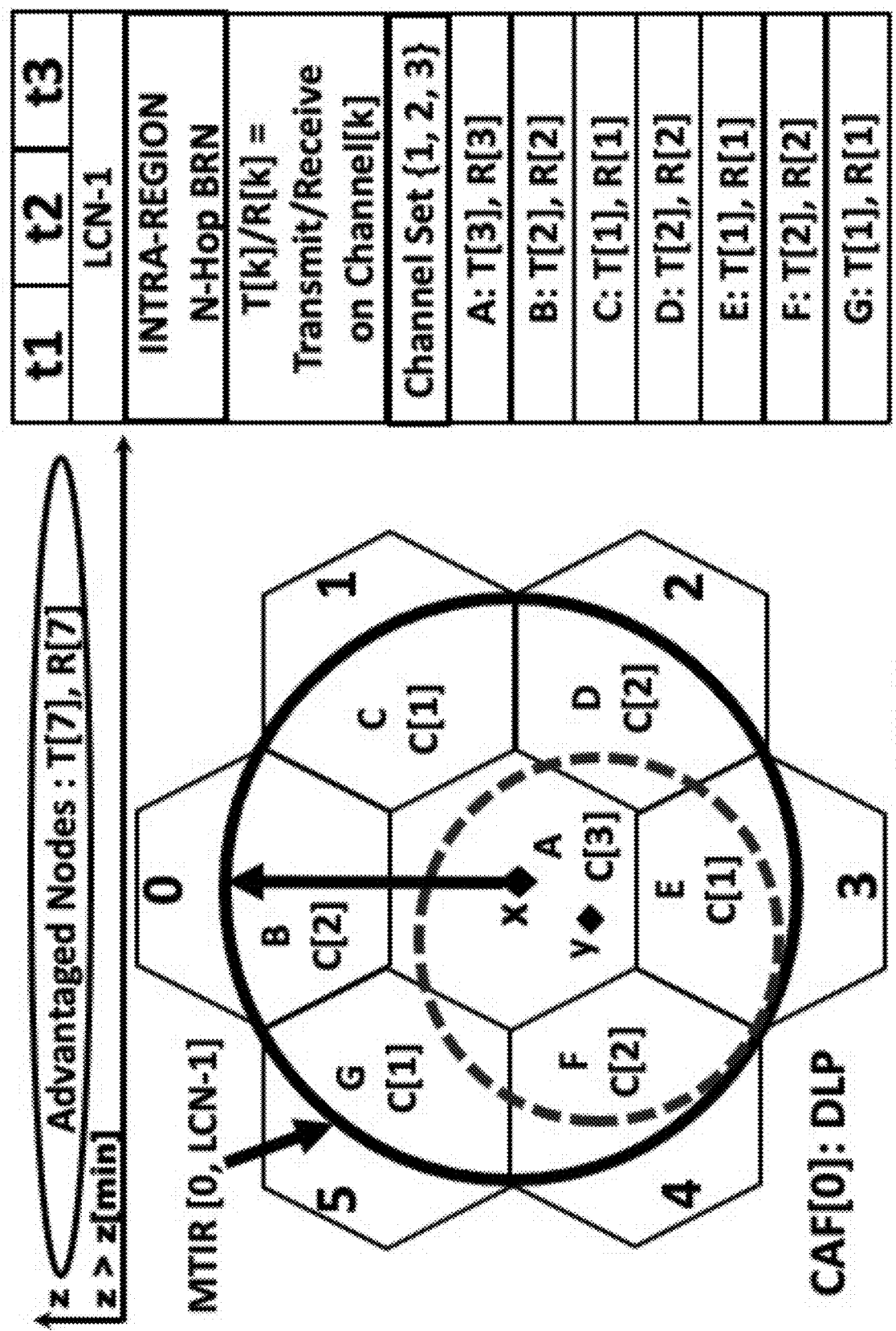
FIG. 7, and FIG. 14, illustrate the particular communication tasks performed during LCN-1, for the lower-tier CAF, and the upper-tier CAF, respectively, in accordance with an embodiment of the disclosed method.
Figure 8:
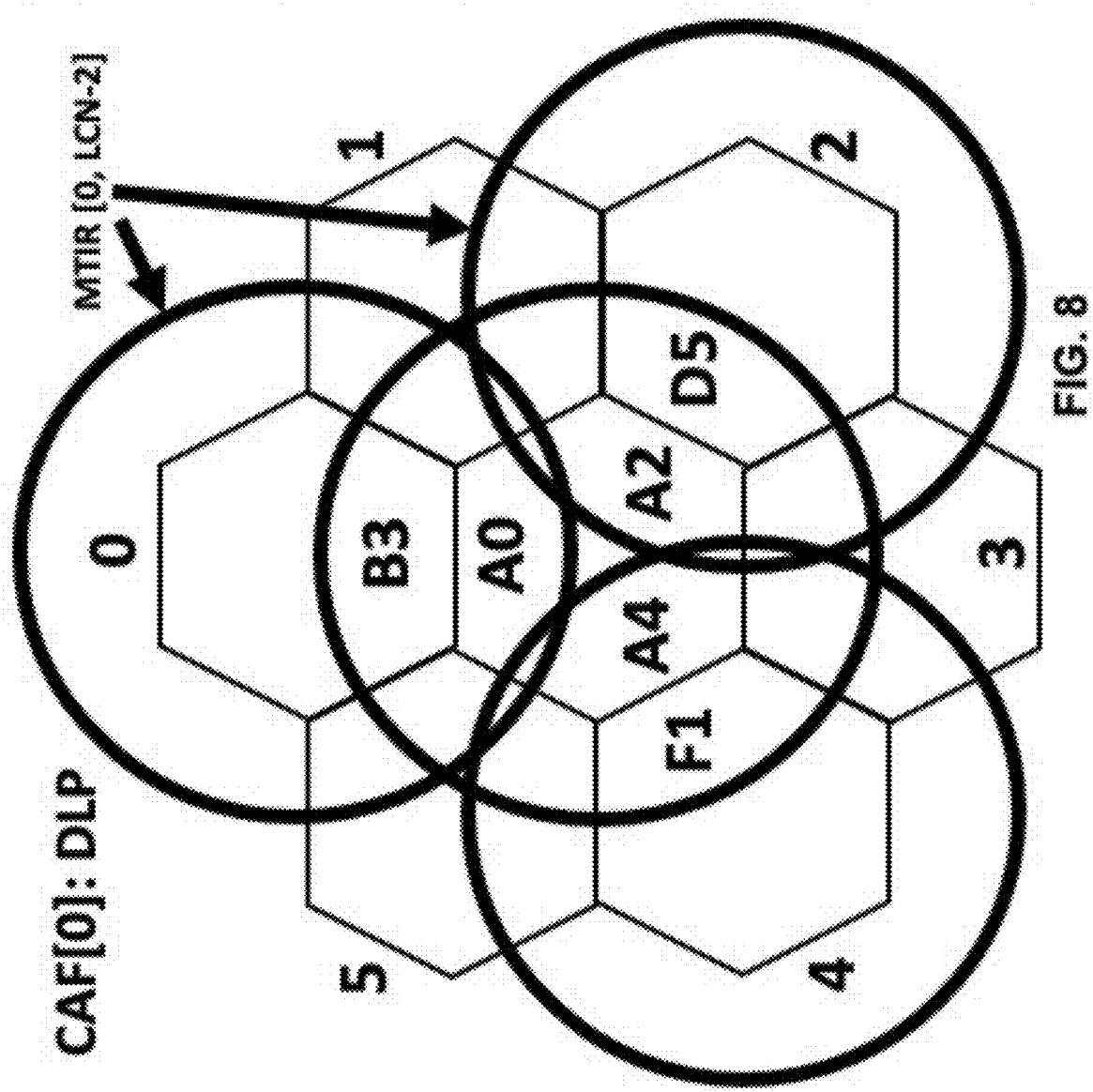
FIGS. 8-11, and FIGS. 15-16, illustrate the particular communication tasks performed during LCN-2, for the FIG. 12, and FIG. 17, illustrate the particular communication tasks performed during LCN-2 for the Terrestrial-to-Advantaged Barrage Relay Network (BRN), in accordance with an embodiment of the disclosed method.
Figure 9:
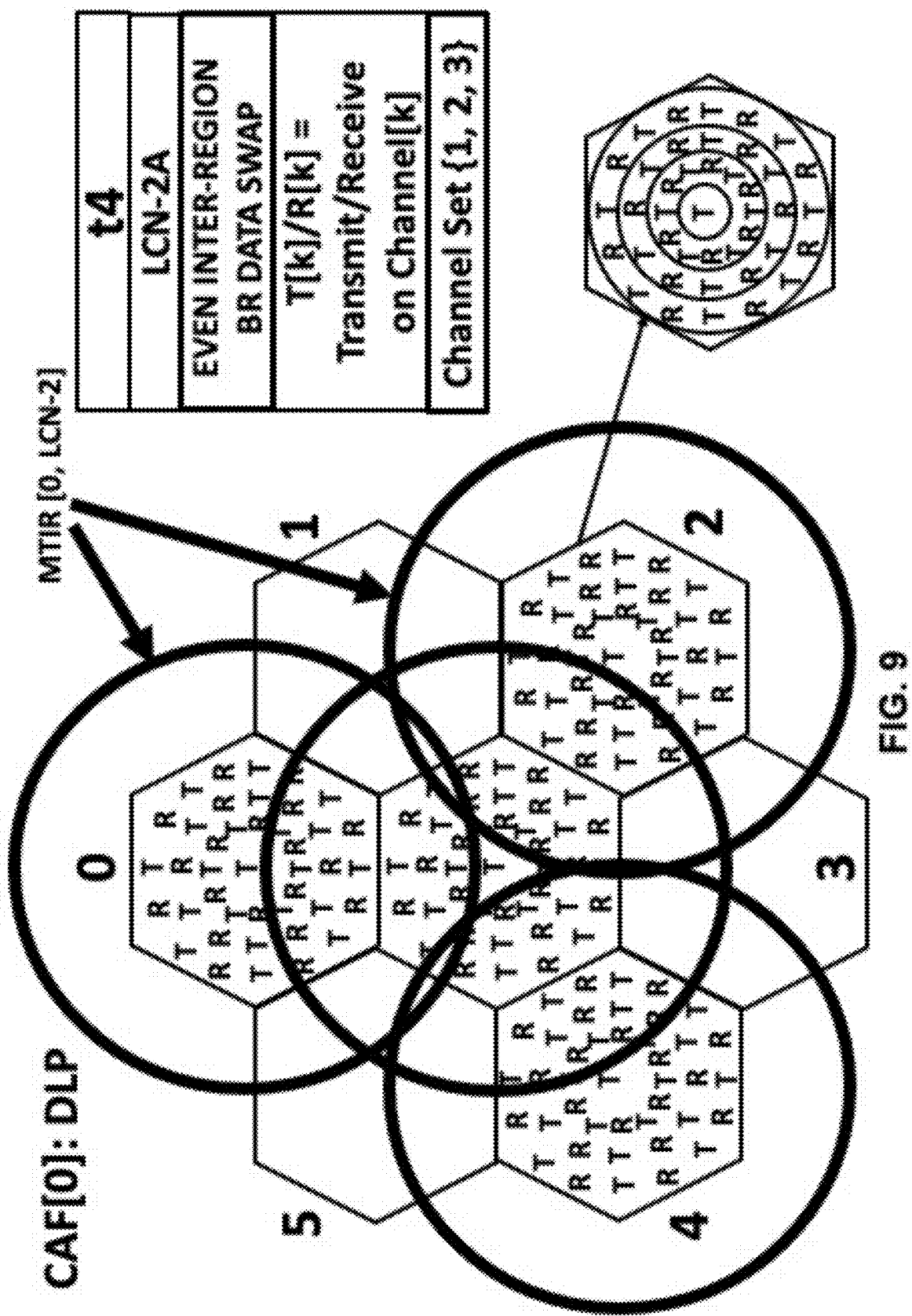
Figure 14:
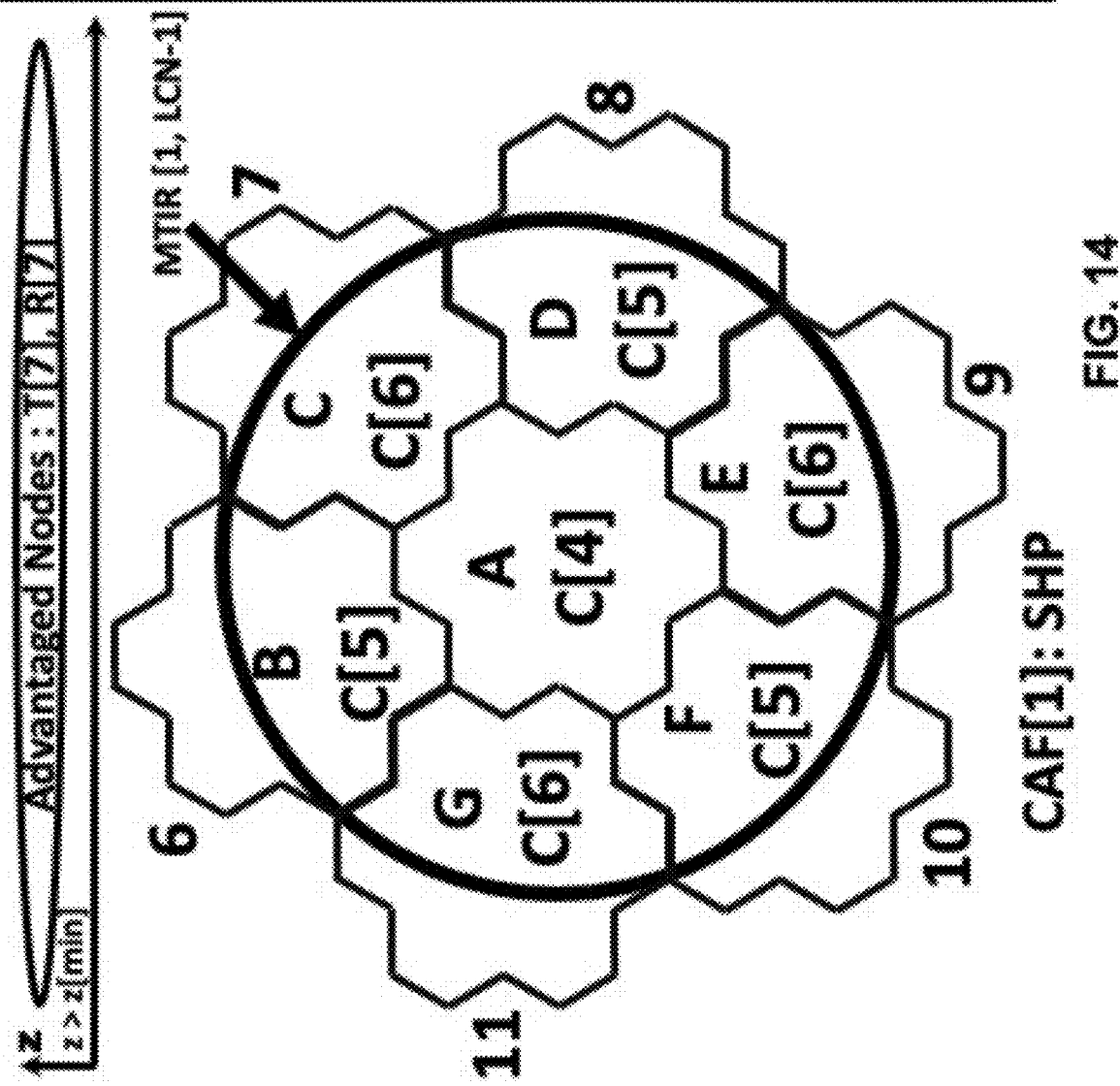
Figure 15:
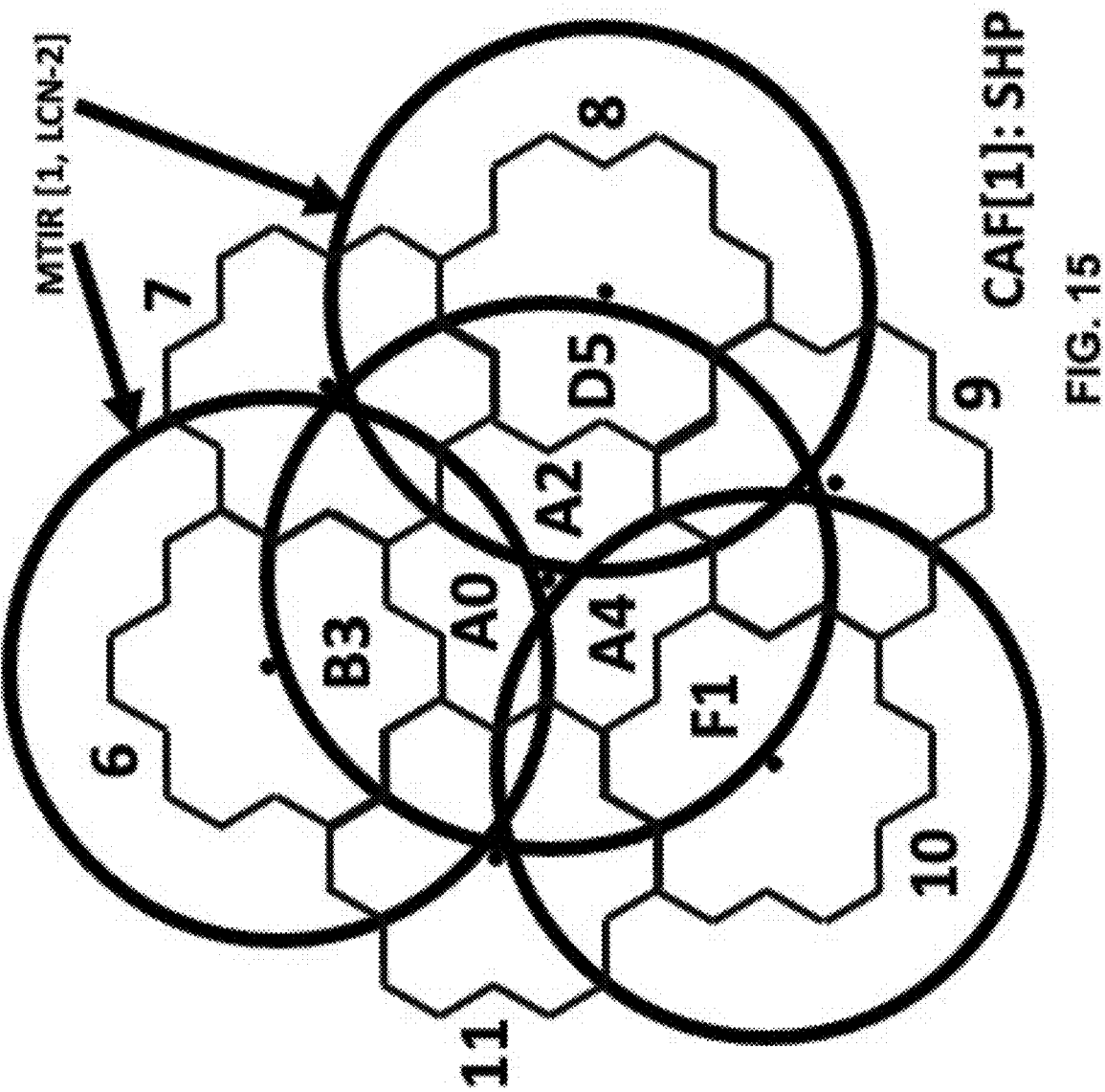
Figure 16:
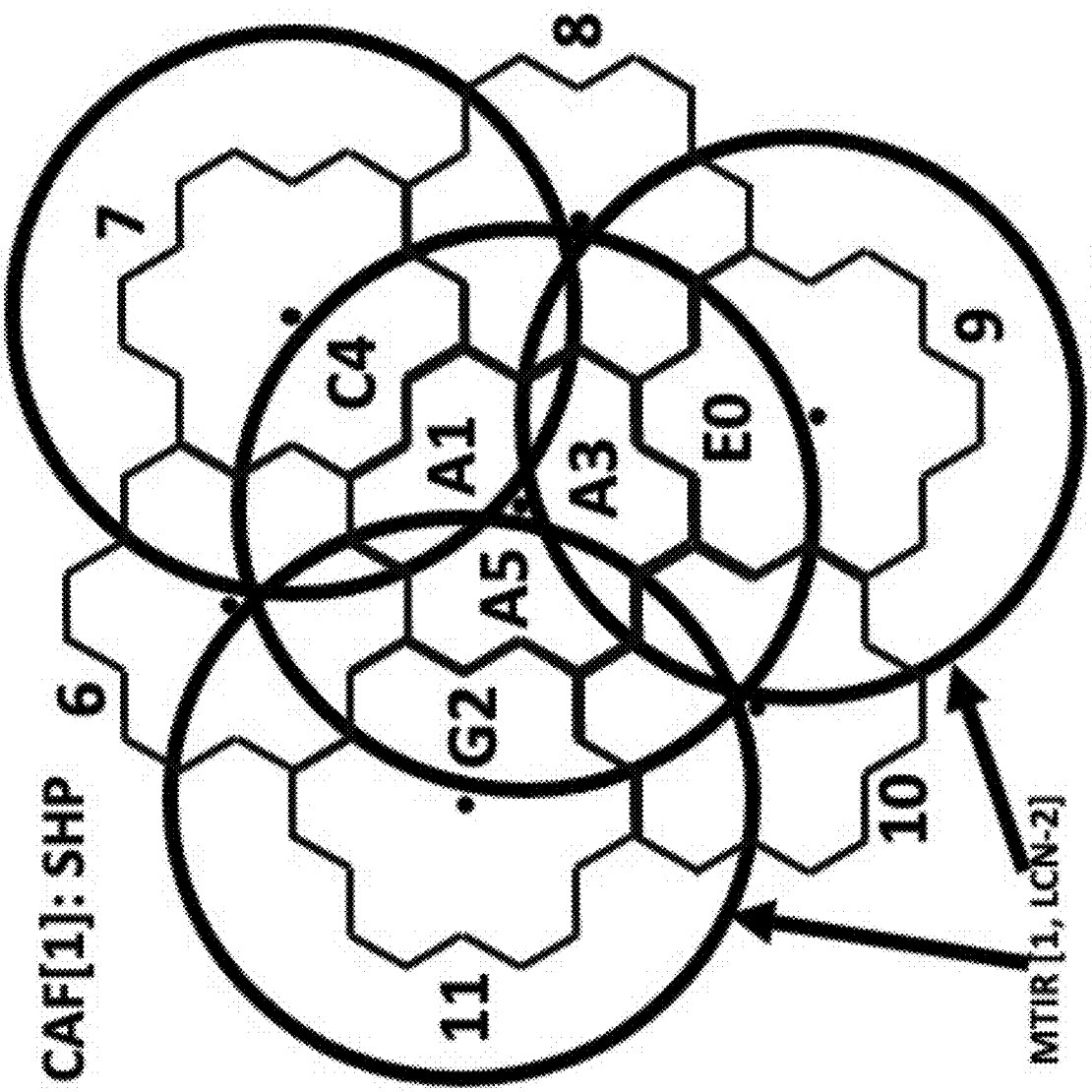

FIG. 7, and FIG. 14, illustrate the particular communication tasks performed during LCN-1, for the lower-tier CAF, and the upper-tier CAF, respectively, in accordance with an embodiment of the disclosed method. In particular, FIG. 7, and FIG. 14, show the particular communication tasks performed during LCN-1, for the tier-0 DLP CAF, and the tier-1 SHP CAF, respectively, and how these tasks are distributed throughout the cell/region.

NOTE: For the discussion relating to FIG. 7-17, the terms 'cell' and 'region' have identical meanings; this is because the discussion pertaining to FIG. 7-17 assumes that the network uses only one of the two CAFs: either the tier[0] DLP CAF, or the tier[1] DLP CAF (i.e., single-tier). After FIG. 17, the meanings of the terms 'cell' and 'region' diverge because a region can dynamically expand to include multiple cells.

With reference to FIG. 7, and FIG. 14, each cell operates as an autonomous, geographically-defined Barrage-Relay Network (BRN), having its own: a) channel, b) Network Controller (NC), c) Network Diameter (ND) elastic adaptation process, d) channel access (MAC) contention process, and e) time slot resource allocation mechanism. In particular, each autonomous region BRN operates in accordance with the disclosures contained in the following US patents, the contents of which are all herein incorporated by reference: a) U.S. Pat. No. 9,629,063: Method and system for global topology discovery in multi-hop ad hoc networks, b) U.S. Pat. No. 9,054,822: Method and system for synchronization of time-slotted barrage relay networks, c) U.S. Pat. No. 8,964,773: Method and system for establishing cooperative routing in wireless networks, d) U.S. Pat. No. 8,964,629: Methods and systems for conducting relayed communication, e) U.S. Pat. No. 8,588,126: Methods and apparatus for network communication via barrage relay onto an independent medium allocation, and f) U.S. Pat. No. 8,873,391: Method and system for coordinating access to a barrage relay network.

With continuing reference to FIG. 7, and FIG. 14, each cell/region NC constantly monitors and adjusts the cell Network Diameter (ND) to ensure complete ETE cell 'coverage; this is accomplished through a constantly running network maintenance process called Network Diameter (ND) Elastic Adaptation, which allows the NC node in each autonomous BR cell/region to measure the maximum (ETE) ND of its region, and dynamically adapt the region ND value to compensate for the local cell/region terrain and signal propagation conditions. For example, regions with flat terrains will experience favorable signal propagation conditions leading to a smaller ND value, while regions with hilly terrains, or high-foliage terrains, will experience unfavorable signal propagation conditions leading to a larger ND value. It is understood that lower ND values result in higher data throughputs, and conversely, higher ND values result in lower data throughputs within a region since more timeslots are required to flood a data packet throughout the region.

Due to the fact that the current ND value could be different from the length of the LCN-1 epoch (i.e., 3), it should not be assumed that the end of an LCN-1 epoch will coincide with the end of a BR data packet flooding wave; for that reason, each region node maintains a separate inter-region data packet buffer that stores all the data packets that have been fully flooded to (and received by) everyone in the region before the beginning of the LCN-2 inter-region epoch; this ensures that all the LCN-2 simultaneously transmitting nodes are transmitting the same data packets, in the same order, thus effectively extending the BR wave for one more hop outside the region.

With continuing reference to FIG. 7, and FIG. 14, during LCN-1 and using the 'advantaged' channel (i.e., channel 7), the advantaged nodes form their own autonomous region which also operates as an autonomous Barrage-Relay Network (BRN), same as the terrestrial BRNs described above, having its own: a) channel (7), b) Network Controller (NC), c) Network Diameter (ND) elastic adaptation process, d) channel access (MAC) contention process, and e) time slot resource allocation mechanism. One difference between the terrestrial BRNs and the Advantaged BRN is the transmission propagation delay, due to the potentially much larger distances that are covered by the airborne transmitters; larger propagation delays cause larger timeslot guard times, which reduce the amount of data that can be transmitted in a single timeslot. In order to compensate for the larger Advantaged node propagation delays (and guard times), the timeslot size used by the Advantaged BRN can be increased subject to the constraint that the frame intra-region and inter-region epoch boundaries are not violated; for example, the intra-region Advantaged BRN could use two timeslots wherein each of the 2 timeslots is 1.5 times the size of the 'terrestrial' timeslot, or even one timeslot wherein the timeslot size is 3 times the terrestrial timeslot size. The same 'enlarge-and-combine' timeslot size adjustment technique can be used during the inter-region epochs.

FIG. 8-11, and FIG. 15-16, illustrate the particular communication tasks performed during LCN-2, for the lower-tier CAF, and the upper-tier CAF, respectively, in accordance with an embodiment of the disclosed method. More specifically, during LCN-2 (i.e., slots t4, t5, aka the inter-region epoch), the nodes in neighboring regions simultaneously swap with each other their most recently received intra-region data, effectively extending the region ND by 2 hops: one hop (i.e., hop[0]) for importing data from the neighboring regions, and one hop (i.e., hop[ND+1]) for exporting data to its neighboring regions.

The simultaneous data swap is accomplished by splitting/partitioning the cell/region node population into a transmitter pool, and a receiver pool; the transmitter pool transmits during both LCN-2A and LCN-2B using the channel assigned by CAM[0] to the cell of the transmitter pool; the receiver pool receives during both LCN-2A, and LCN-2B, using the channel assigned by CAF[0] to the transmitter pool of their 'even-oriented', and 'odd-oriented', neighboring regions, respectively. In particular, the following events take place:

a) During both LCN-2A and LCN-2B, each node in the region transmitter pool transmits (twice) the data packets that have been fully flooded to the entire region population up until the end of the most recently completed intra-region epoch, using the channel assigned by CAF[0] to the cell in which the transmitter pool is located.
  b) During inter-region slot t4 (LCN-2A), each node in the region receiver pool receives the data packets being transmitted by the transmitter pools of his 'even-oriented' neighbor cells (i.e., cells 0, 2, and 4), using the channel assigned by CAF[0] to his 'even-oriented' neighbor cells.
  c) During inter-region slot t5 (LCN-2B), each node in the region receiver pool receives the data packets being transmitted by the transmitter pools of his 'odd-oriented' neighbor cells (i.e., cells 1, 3, and 5), using the channel assigned by CAF[0] to his 'odd-oriented' neighbor cells.

Figure 10:
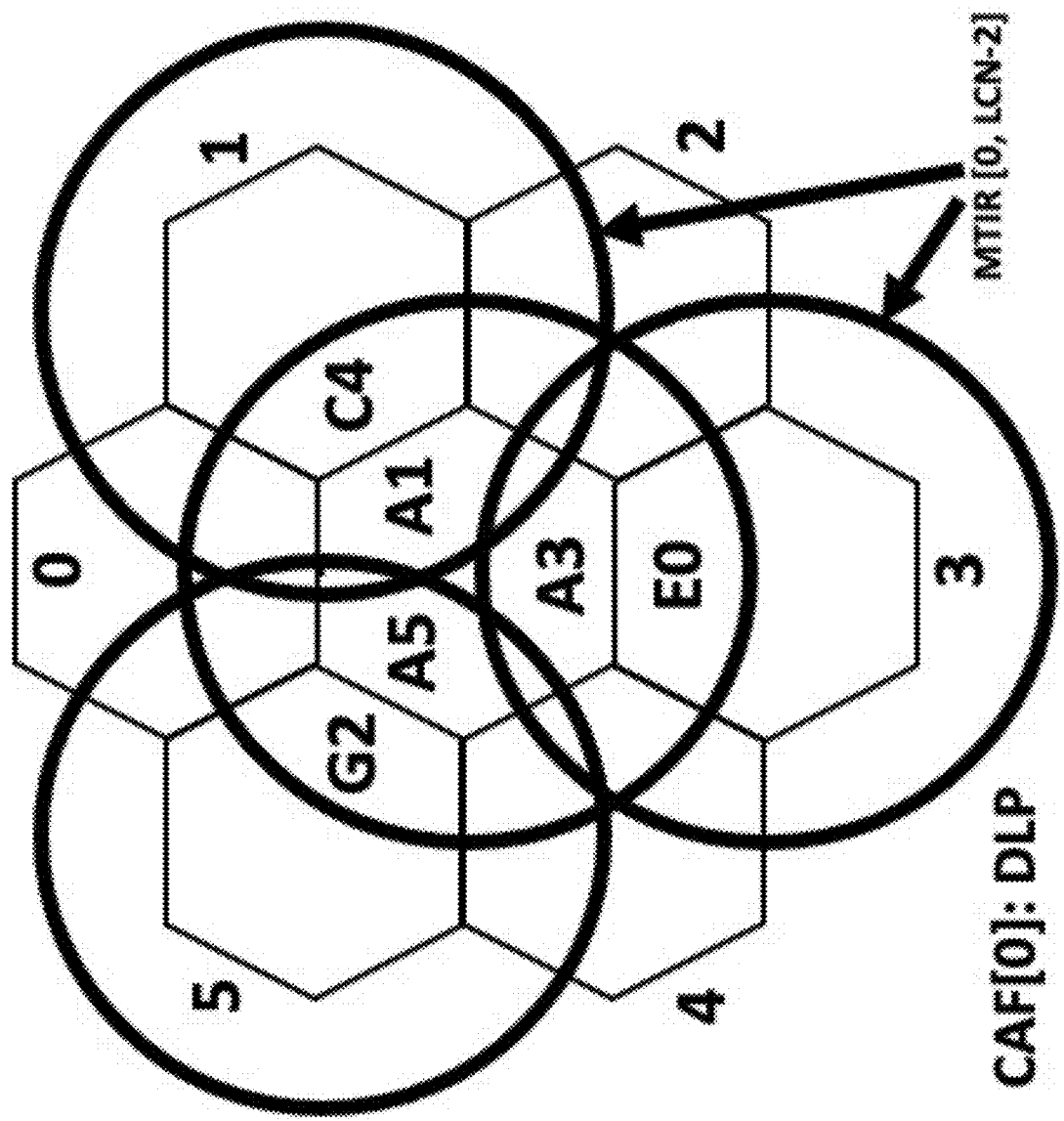
Figure 11:
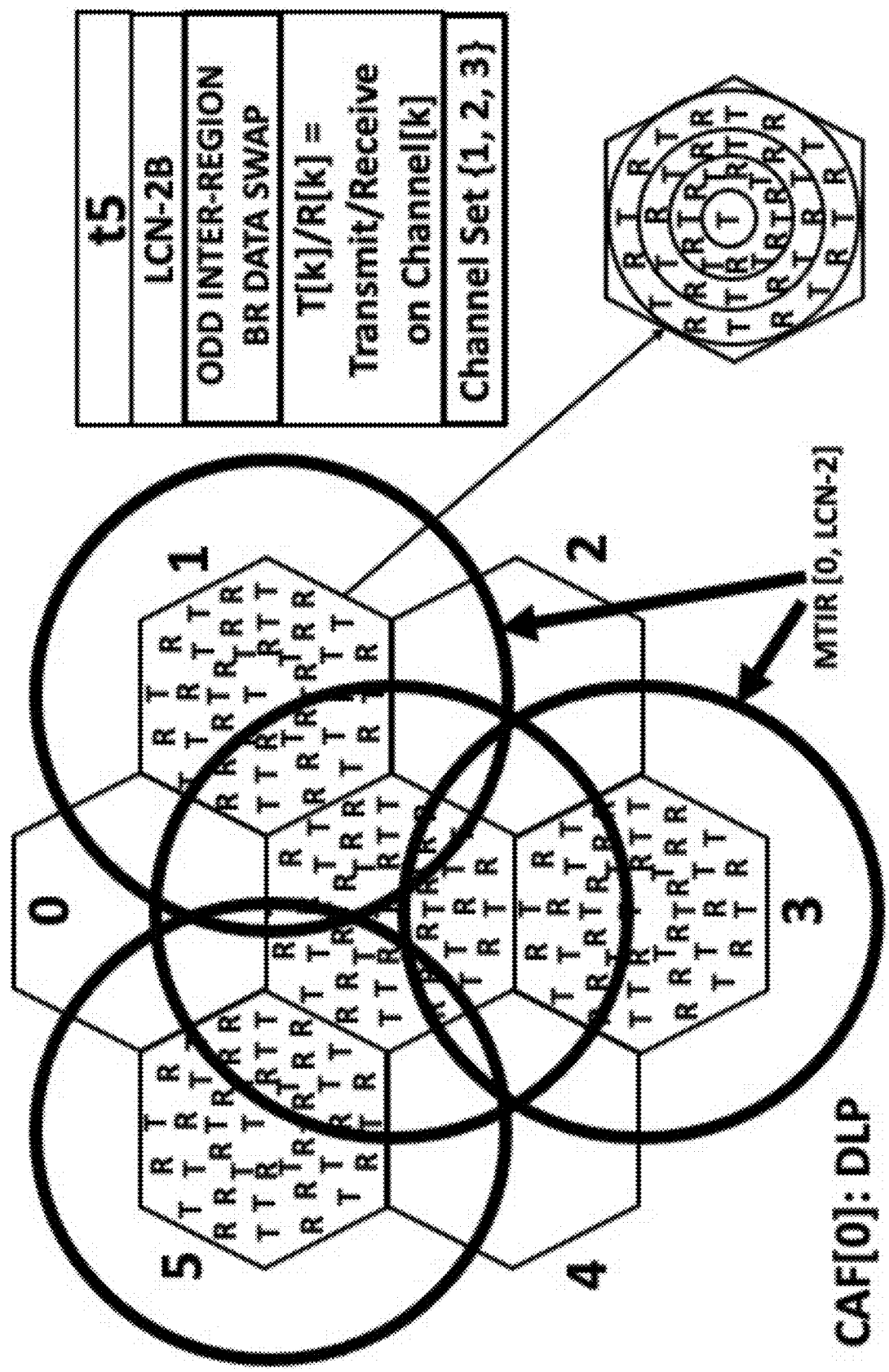

Because the transmission interference range of the neighboring cell transmissions is regulated by the Middle-Out APC mechanism, the region receiver pool in each region will naturally be split into 3 minimally overlapping Cell Reception Areas (CRA): CRAs A0, A2, A4 for LCN-2A (FIG. 8 and FIG. 9), and CRAs A1, A3, A5 for LCN-2B (FIG. 10 and FIG. 11).

Transmitter/Receiver Pool Selection/Splittinq (TRPS)

In order to minimize terrain blockage effects, the transmitters and receivers are selected so that they are evenly distributed throughout the cell area, according to a concentric multi-zone pattern; this will maximize the probability there is at least one transmitter (in the sending cell) and at least one receiver (in the receiving cell) that can successfully close a link. Just like information bit interleaving makes FEC more robust with respect to burst errors, transmitter/receiver location interleaving makes the BR transmission wave more robust with respect to terrain 'burst errors' (i.e., concentrated terrain blockages).

One possible way of selecting the transmitters and receivers is as follows:

a) Define 4 distance thresholds DIST[k], where the distance is measured from the middle of the cell,
  b) Create 4 lists, where each LIST[k] contains cell members whose distance from the middle of the cell is greater than DIST[k−1] but less than or equal to DIST[k],
  c) Sort the nodes in each LIST[k] by their relative angle with respect to the cell 'equator' line, and
  d) Loop through each sorted LIST[k] and alternate between picking one transmitter, and one receiver.

At the end of this process, the transmitters should be evenly distributed with respect to both their distance from the middle of the cell, and their relative angle with respect to the cell equator line.

Impact of Region Fragmentation on LCN-2

With continuing reference to FIG. 8-11 and FIG. 15-16, if a cell (or super-cell) gets fragmented, then each cell (or super-cell) fragment will execute the transmitter/receiver pool selection process independently of each other. Each cell fragment will act as an independent BRN, with its own NC and ND elastic adaptation process. However, cell fragmentation will cause data 'collisions' during the LCN-2 inter-cell data swapping phase because, due to each cell fragment having its own transmitter pool, the multiple cell fragments will be exporting different LCN-1 data to the same neighbor receiver pools, at the same time.

The above situation can be mitigated by splitting LCN-2 into multiple Time Slot Groups (TSGs), and allocate a separate LCN-2 TSG to each cell fragment transmitter pool; that way, the multiple transmitter pools will not collide with each other, and the neighbor receiver pools will be able to capture the exported data from each transmitter pool separately, without losing any data. Cell fragmentation will initially be detected by the affected neighbor receiver pools, when they realize that they are receiving data from the same neighbor cell but the transmitters advertise different NCs in the packet header; upon detecting that condition, the neighbor receiver pools will instruct their fragmented cell neighbors to use different LCN-2 TSGs; the LCN-2 TSG assignment will be done in a deterministic manner (i.e., the fragment with the highest NC ID will get the 1st TSG, and so forth . . . )

Another way to mitigate the occurrence of fragmented regions is to move up one channel assignment tier, and use the next level CAF and transmit power levels; by being able to transmit using a higher transmission power, the region fragmentation could be completely cured.

Figure 17:
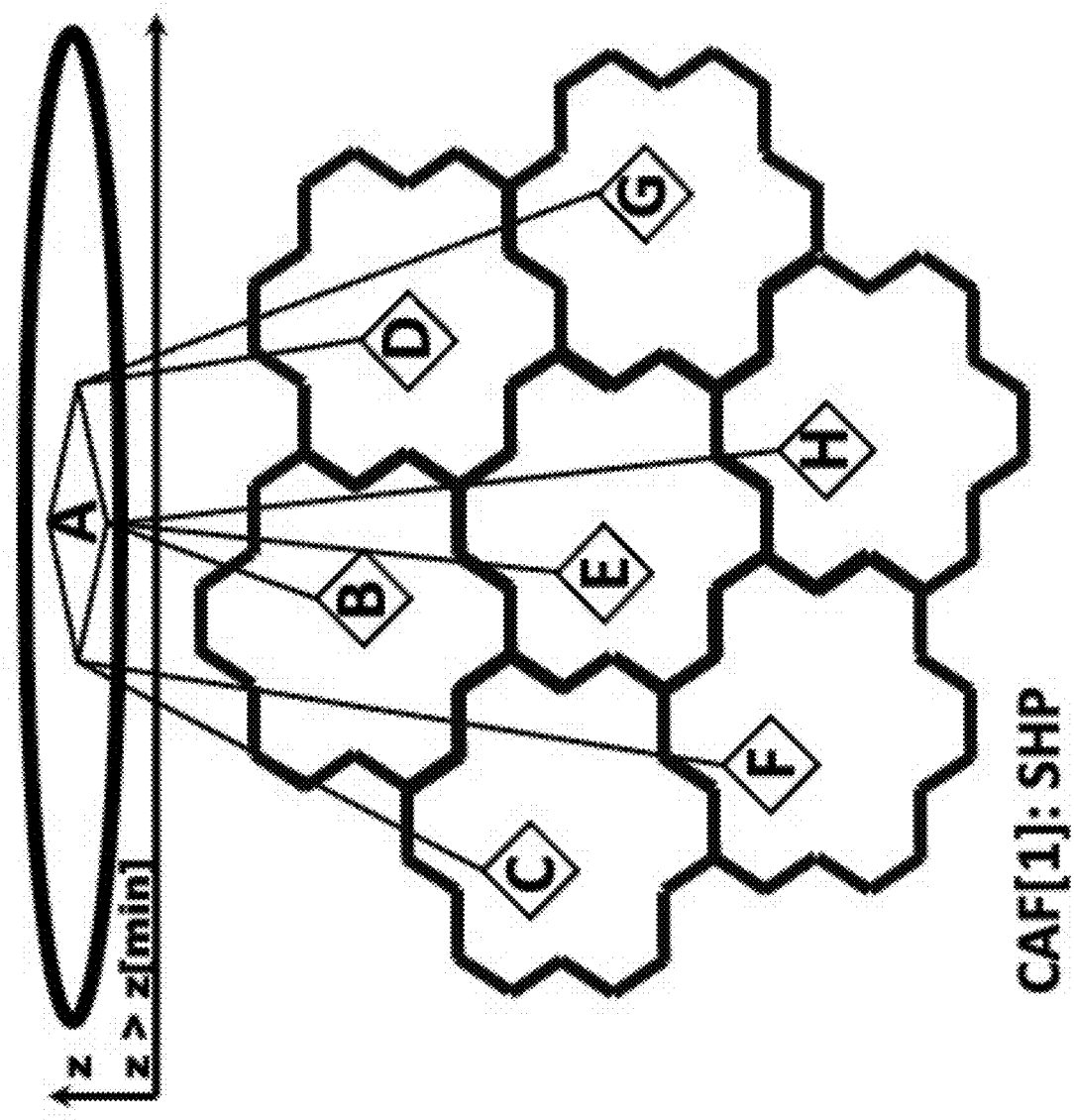
Figure 18:
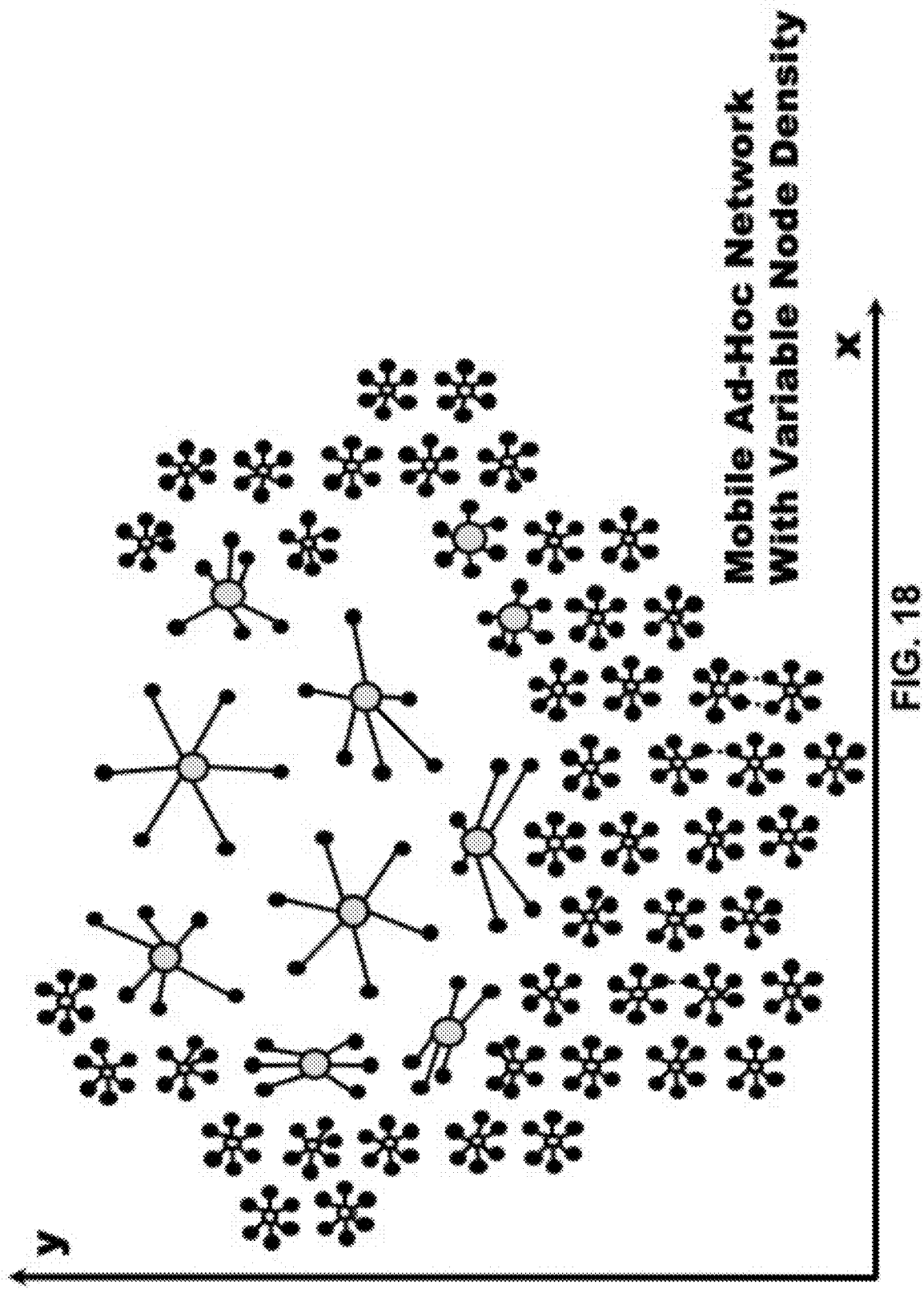
FIG. 18 illustrates an example mobile ad-hoc network where the local node density varies through space.

FIG. 12, and FIG. 17, illustrate the particular communication tasks performed during LCN-2 for the Terrestrial-to-Advantaged Barrage Relay Network (BRN), in accordance with an embodiment of the disclosed method. More specifically, also in LCN-2, while the 'terrestrial' region members are engaged in inter-region data swapping, the NC (or some other special designated node) from each terrestrial region switches to channel 7 (i.e., the Advantaged Node channel), and joins the NC of the Advantaged Region to form a Terrestrial-to-Advantaged BRN that operates in accordance with the rules discussed in the FIG. 7 discussion. In other words, the nodes participating in the LCN-2 Terrestrial-to-Advantaged BRN, contend, transmit and receive data to/from each other, as if they were members of a terrestrial BRN.

The LCN-2 Terrestrial-to-Advantaged BRN is used by: a) the terrestrial region NCs and the Advantaged Region NC in order to form an aerial backbone network intended for the rapid network-wide dissemination of urgent traffic that needs to get to everyone in the network with minimal delay, b) isolated nodes that have exhausted all ways of establishing terrestrial connectivity, and c) terrestrial nodes with elevation high enough (e.g., nodes on top of a hill) so that their transmissions would disrupt the terrestrial channel reuse pattern even after APC is applied.

Figure 13:
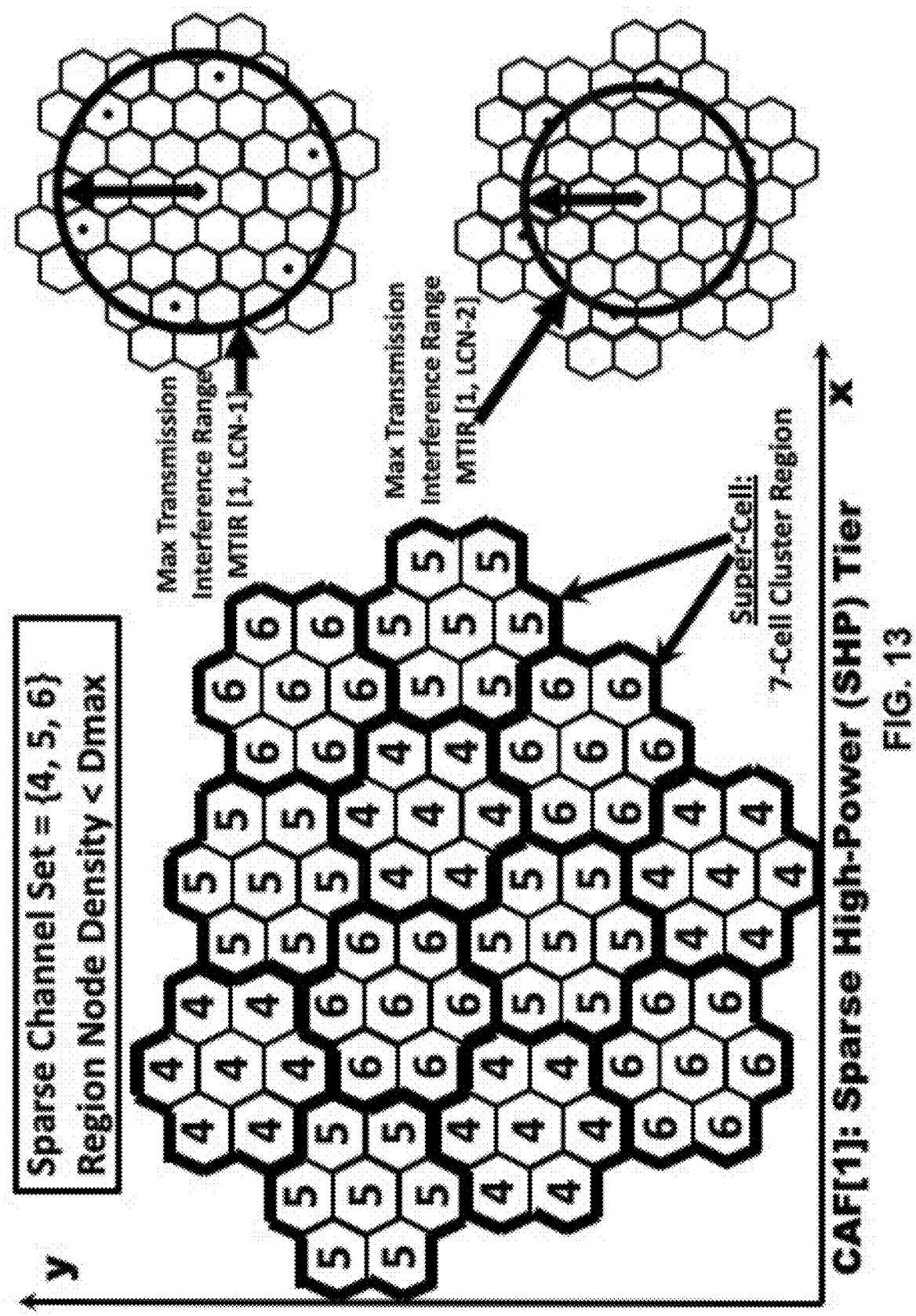
FIG. 13 illustrates the upper-tier CAF, and the associated channel set, logic condition(s), and MTIR for LCN-1/LCN-2, in accordance with an embodiment of the disclosed method.

FIG. 13 illustrates the upper-tier CAF, and the associated channel set, logic condition(s), and MTIR for LCN-1/LCN-2, in accordance with an embodiment of the disclosed method.

Figure 19:
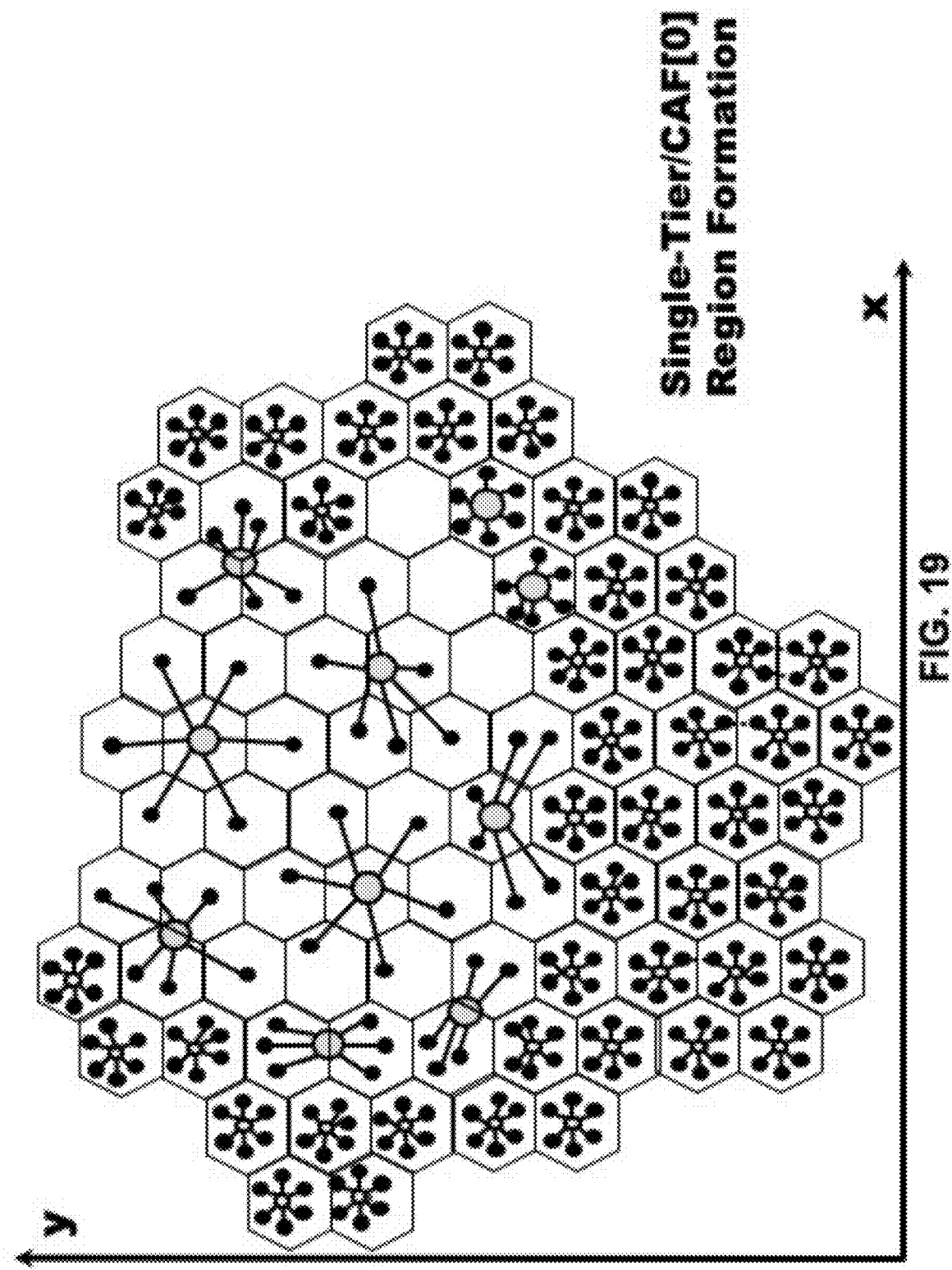
FIG. 19 illustrates the geographic region formation that results from using only the lower-tier CAF, in accordance with an embodiment of the disclosed method.

FIG. 19 illustrates the geographic region formation that results from using only the lower-tier (i.e., tier[0] DLP) CAF, in accordance with an embodiment of the disclosed method; it can be seen that while the dense network areas are properly 'fitted' within the smaller level[0] cells, the north-center sparse network areas end up having isolated nodes and under-crowded regions with a total region population that is less than the predetermined minimum region population.

Figure 20:
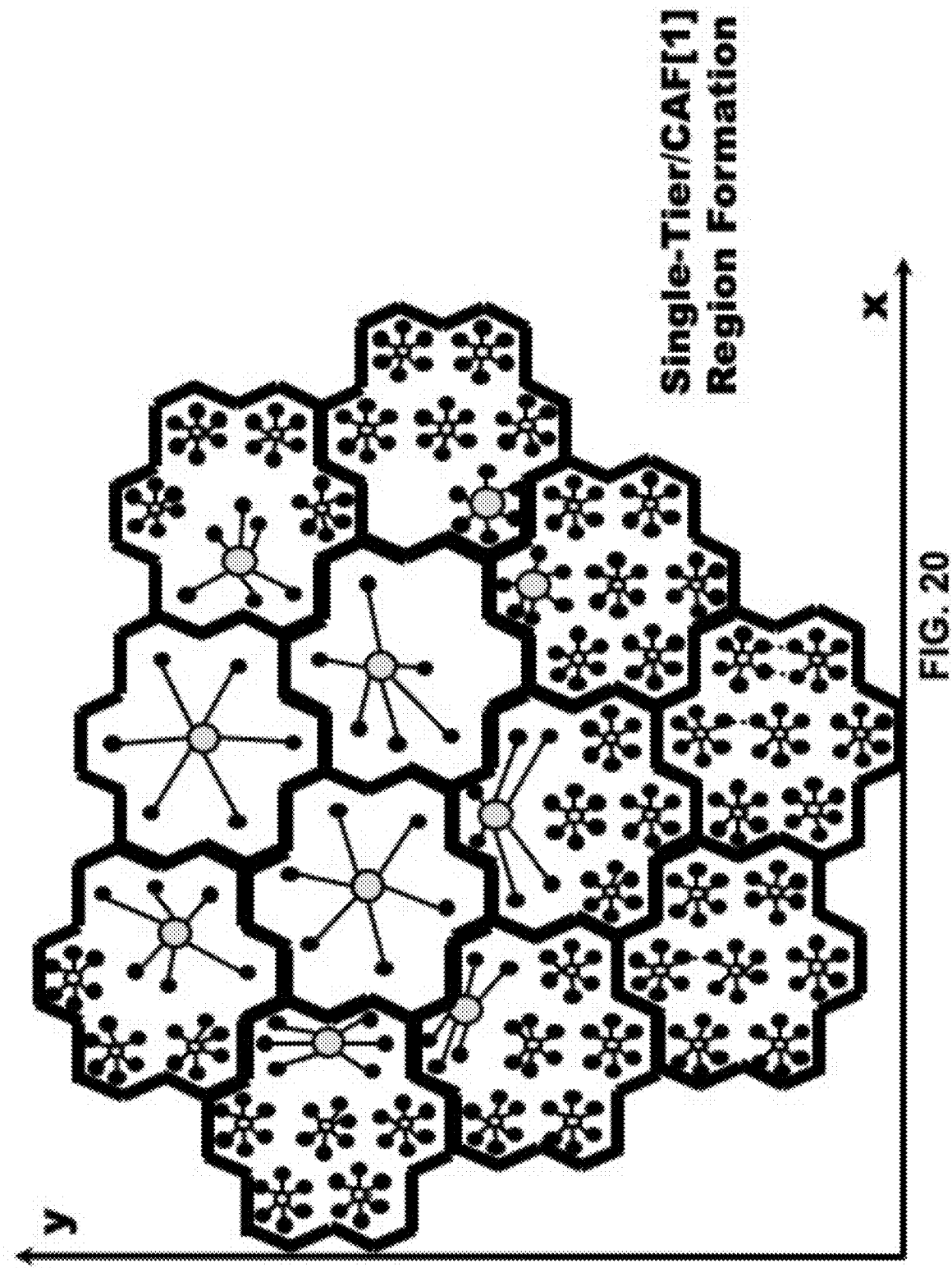
FIG. 20 illustrates the geographic region formation that results from using only the upper-tier CAF, in accordance with an embodiment of the disclosed method.

FIG. 20 illustrates the geographic region formation that results from using only the upper-tier (i.e., tier[1] SHP) CAF, in accordance with an embodiment of the disclosed method; it can be seen that while the sparse network areas are properly 'fitted' within the larger level[1] cells, the dense network areas end up having overcrowded regions with a total region population exceeding the predetermined maximum region population.

Figure 21:
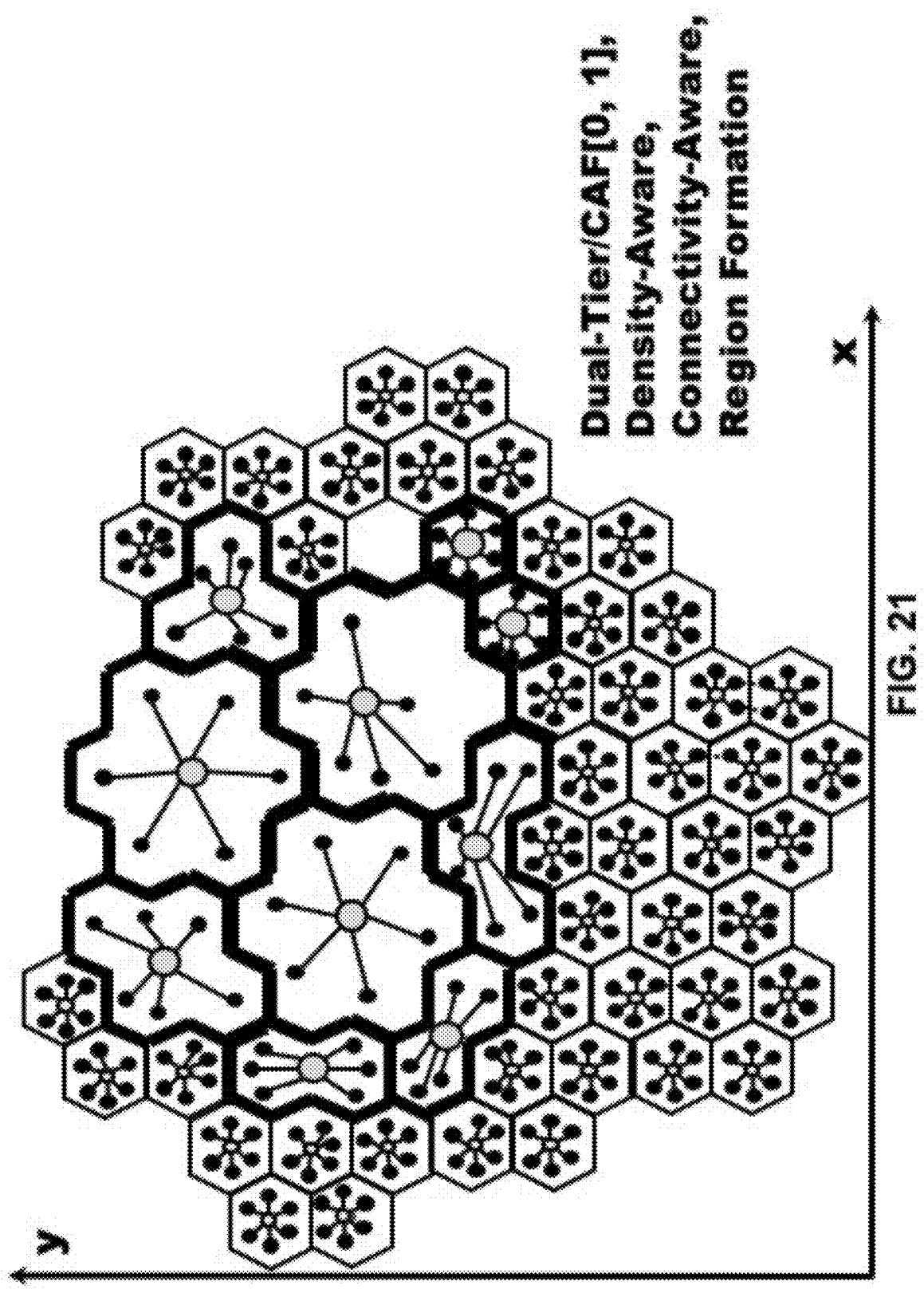
FIG. 21, and FIG. 22 illustrate one possible geographic region formation, and channel assignment, respectively, that result from using a dynamic, density-aware, dual-tier CAF in accordance with an embodiment of the disclosed method.
Figure 22:
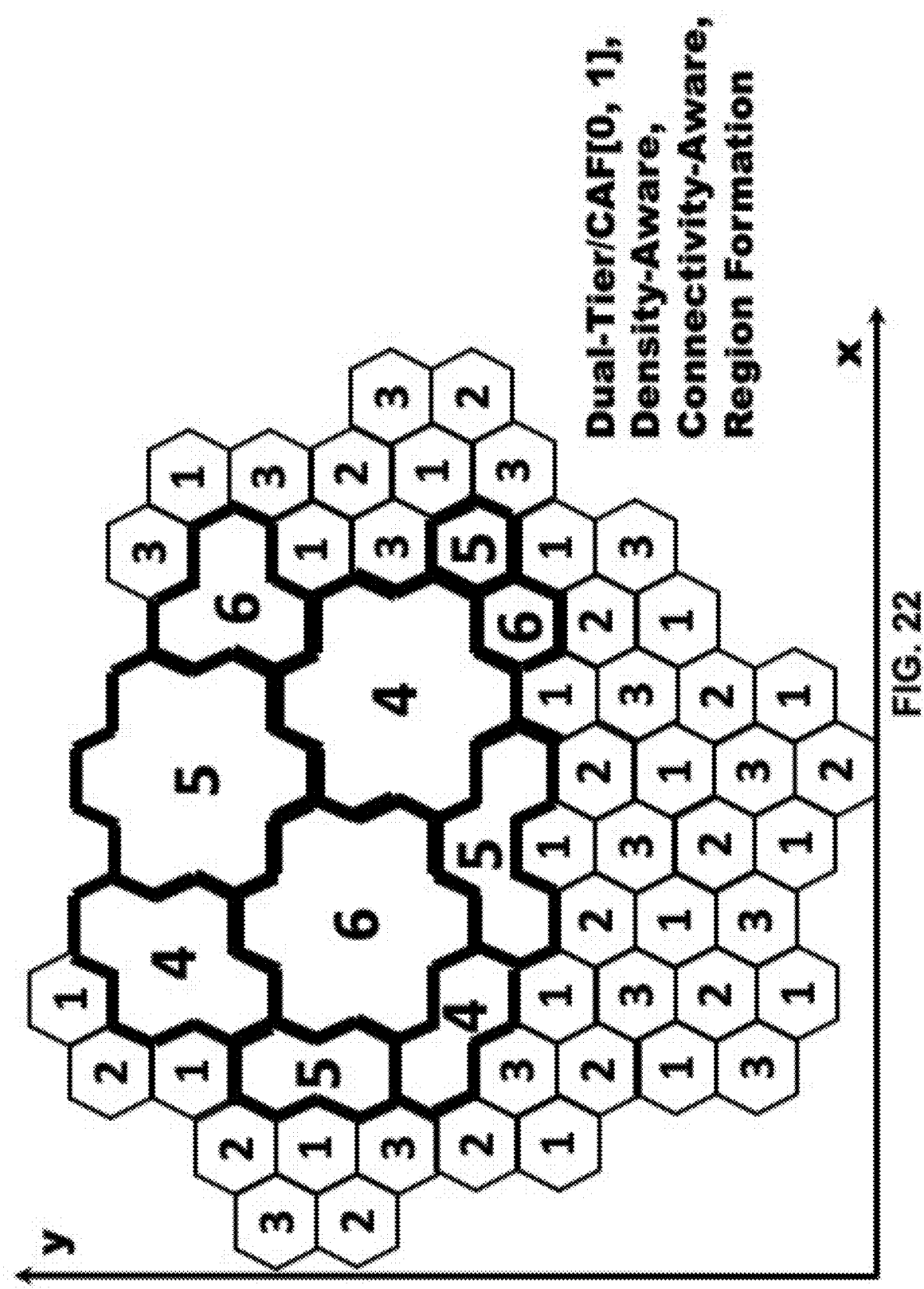

FIG. 21, and FIG. 22 illustrate a possible geographic region formation, and channel assignment, respectively, that results from using a dynamic, density-aware, dual-tier CAF in accordance with an embodiment of the disclosed method. It can be seen that the dynamically formed regions can have different shapes and sizes, subject to the constraint that they contain an integer multiple of level[0] cells. The level[0] cell is the smallest geographic area unit that can be assigned a channel.

With reference to FIGS. 21 and 22, under the disclosed multi-tier, hybrid channel assignment approach, region formation is governed by a common set of rules (i.e., logic conditions that must be fulfilled) that is implemented/enforced through a distributed region formation algorithm that is running at each node. In order for the region formation algorithm to converge towards the same final result at each node, it is important that all the nodes within a geographic neighborhood are executing the region formation algorithm using the same input data; this is accomplished by making sure that the network maintenance control packets, as well as the routing update packets, that are carrying information that is used by the region formation algorithm are transported quickly and reliably throughout the network, so that all the nodes within a given geographic neighborhood are executing the region formation algorithm using the same input data.

The set of rules that is used by the distributed region formation algorithm comprises the following rule-sets/conditions:

1) The total number of nodes within a region (i.e., region population) is less than a predetermined maximum region population, and greater than a predetermined minimum region population, wherein: a) if the region population is greater than the maximum region population then the overcrowded region will recursively split, in a predictable manner (i.e., using a common set of rules), into two or more smaller regions until the region population of each of the smaller regions is less than the maximum region population, and b) if the region population is less than the minimum region population then the under-crowded region will recursively merge, in a predictable manner (i.e., using a common set of rules), with a neighboring region until the region population of the combined/merged region is greater than the minimum region population and less than the maximum region population;

2) There are at least K nodes in a region wherein each one of the K nodes has at least one connected 1-hop neighbor node belonging to a neighbor region (i.e., inter-region neighbor node), and further wherein each inter-region neighbor node belongs to a different neighbor region; and 3) Transmissions originating by any node within a region must reach every destination node located within a predetermined distance D from the region center within a predetermined number of transmission hops that is less than N, where D is a positive real number, and N is a positive integer number.

Rule-set (1) regulates the local network density, and tries to ensure (to the maximum extent possible) that there will not be any overcrowded regions, which would cause the region members to start experiencing data throughput degradation, or under-crowded regions, which would cause packet transmissions to traverse more transmission hops unnecessarily.

Rule-sets (2) and (3) regulate local network reachability/connectivity, and try to ensure (to the maximum extent possible) that there will not be any isolated regions, or regions that are not evenly connected in all geographic directions, which would cause inter-region data throughput degradation.

It should be understood that the above rule-sets are ultimately limited by the actual network topology, node locations, and terrain conditions; therefore, there may be situations where the network topology is such that the above rule-sets may not be able to cure the negative topology conditions. As a result, the region formation algorithm needs to be aware of the actual node connectivity within a predetermined geographical area and take that knowledge into account when trying to determine the final region selection;

if none of the above conditions can be decisively met, and produce a clear 'winner', then the region formation algorithm has to assign a relative weight/preference to each of the density and connectivity metrics that are used by the algorithm, and break the 'tie' by picking a channel that results in a region shape that produces the highest combined relative score based on the relative weights assigned to each metric and some predetermined expression that combines them to produce an overall numerical score.

Figure 23:
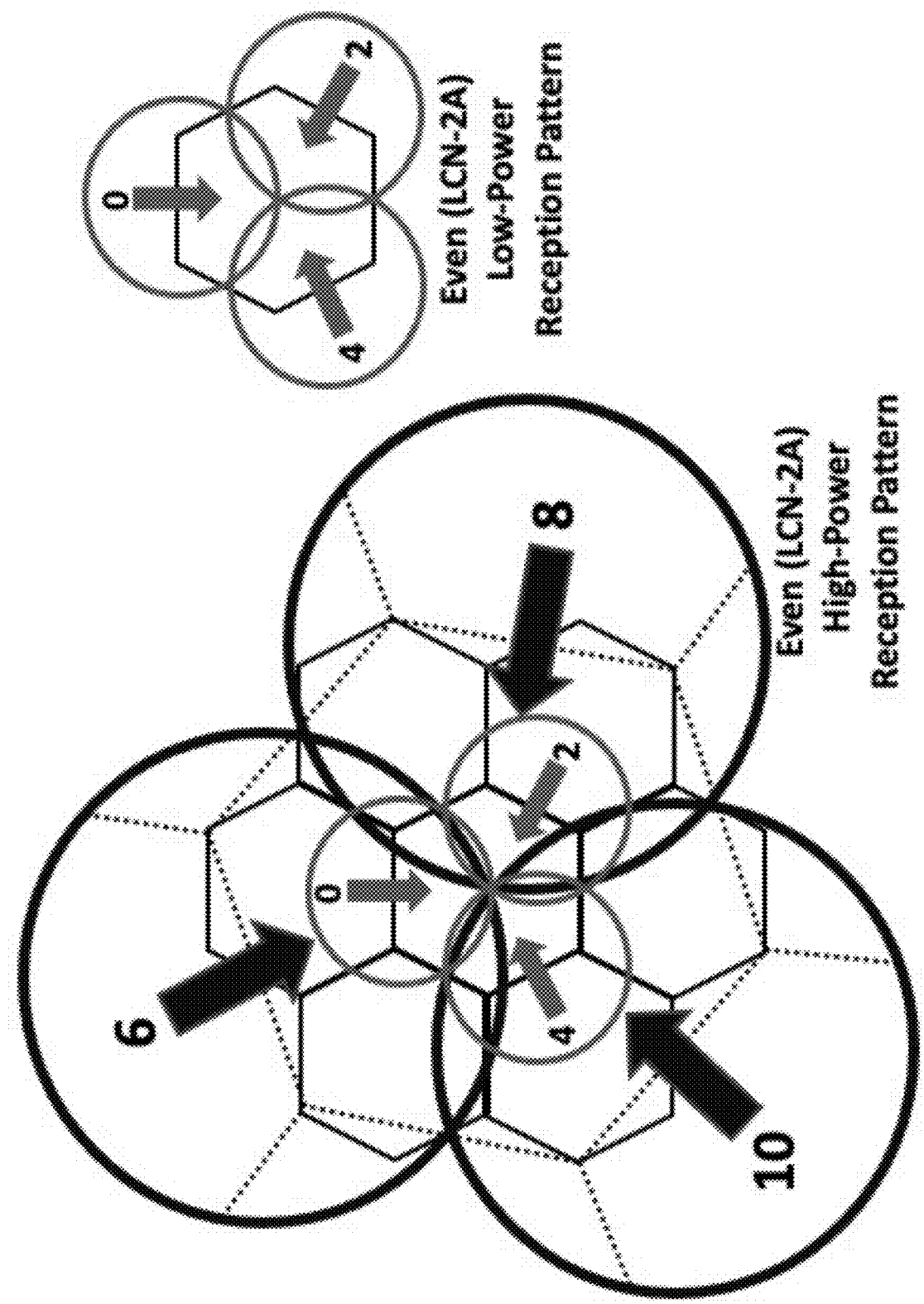
FIGS. 23-26 illustrate various transmission interference patterns that may result from using a dynamic, density-aware, dual-tier CAF, in accordance with an embodiment of the disclosed method.
Figure 24:
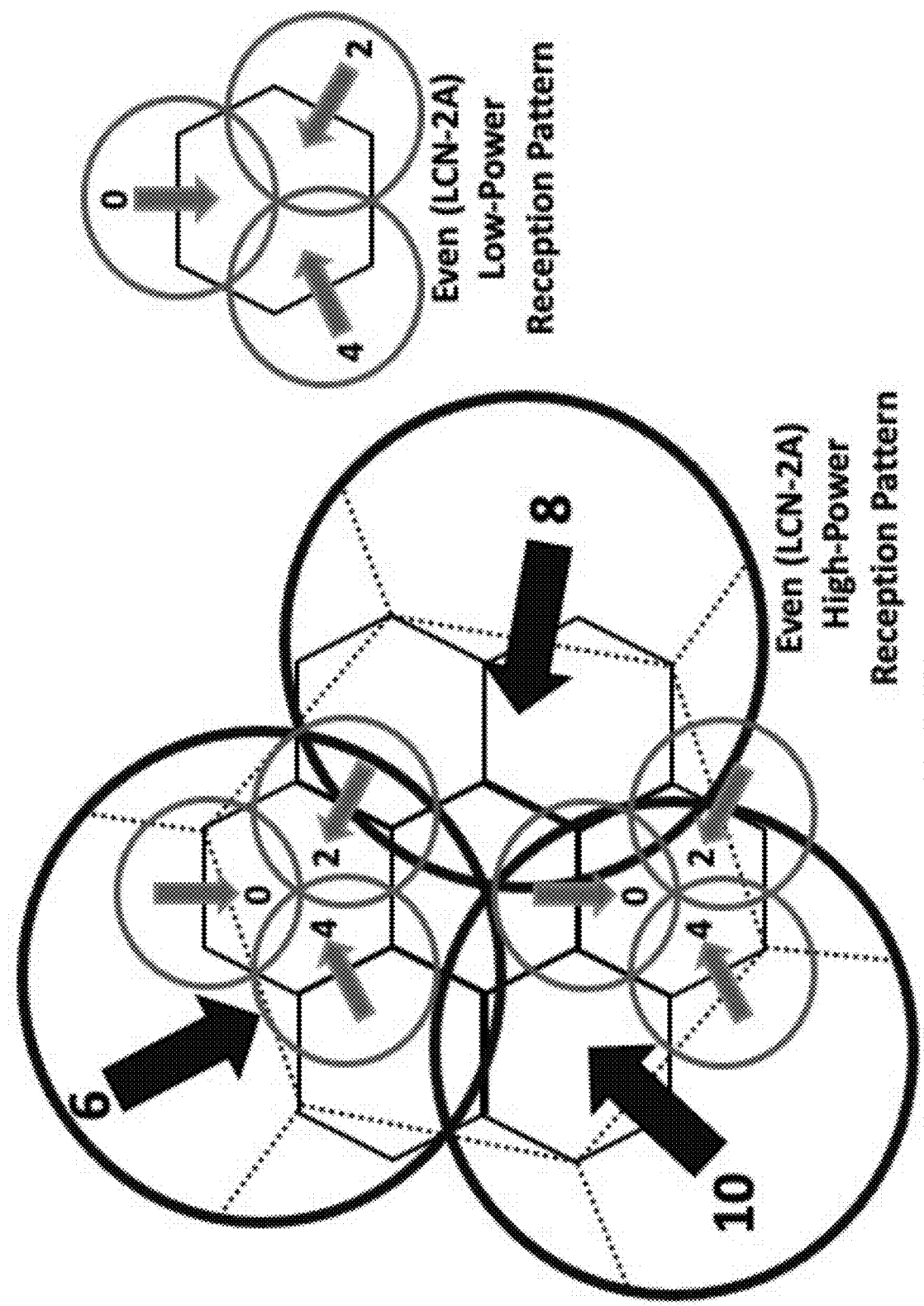
Figure 25:
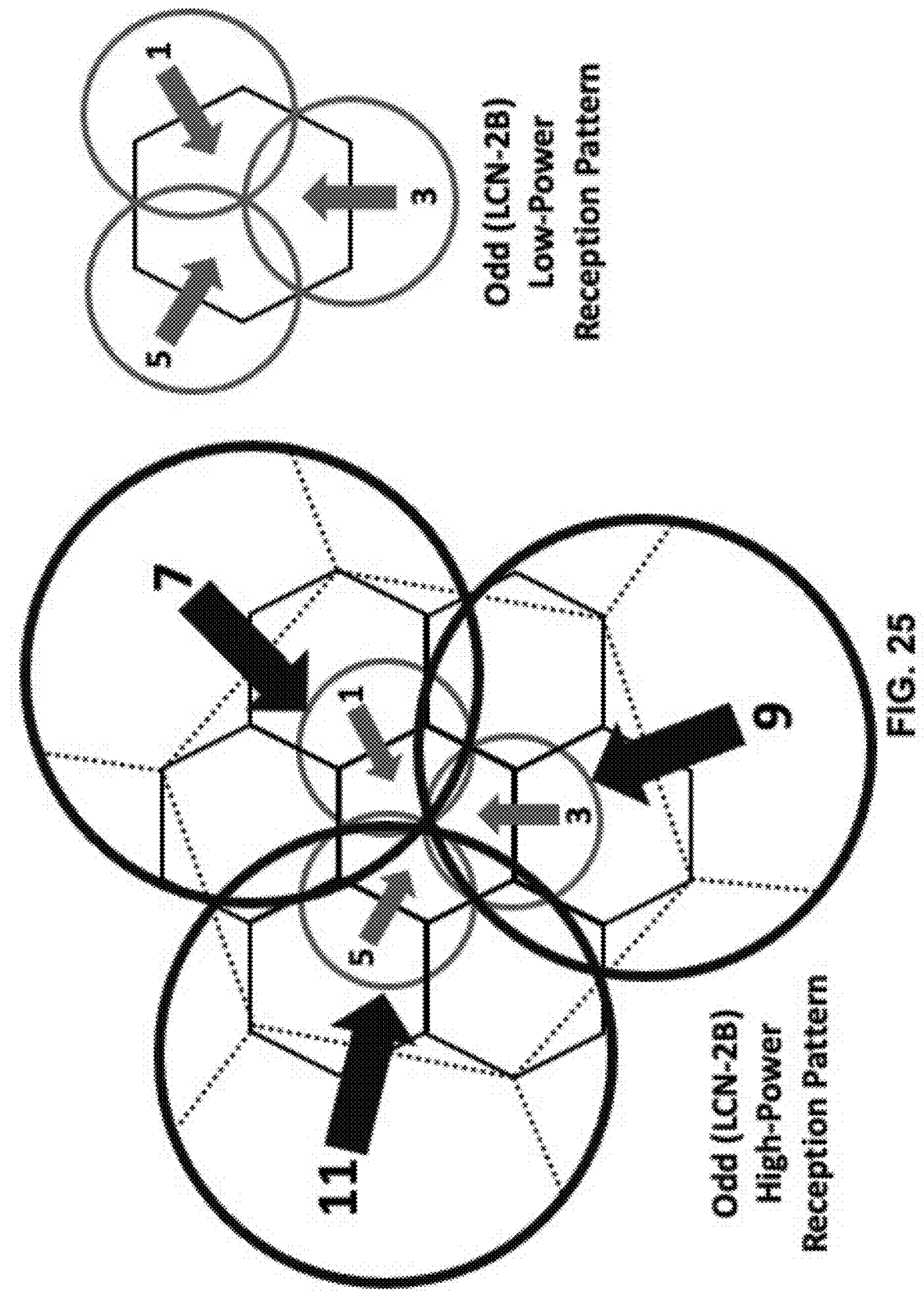
Figure 26:
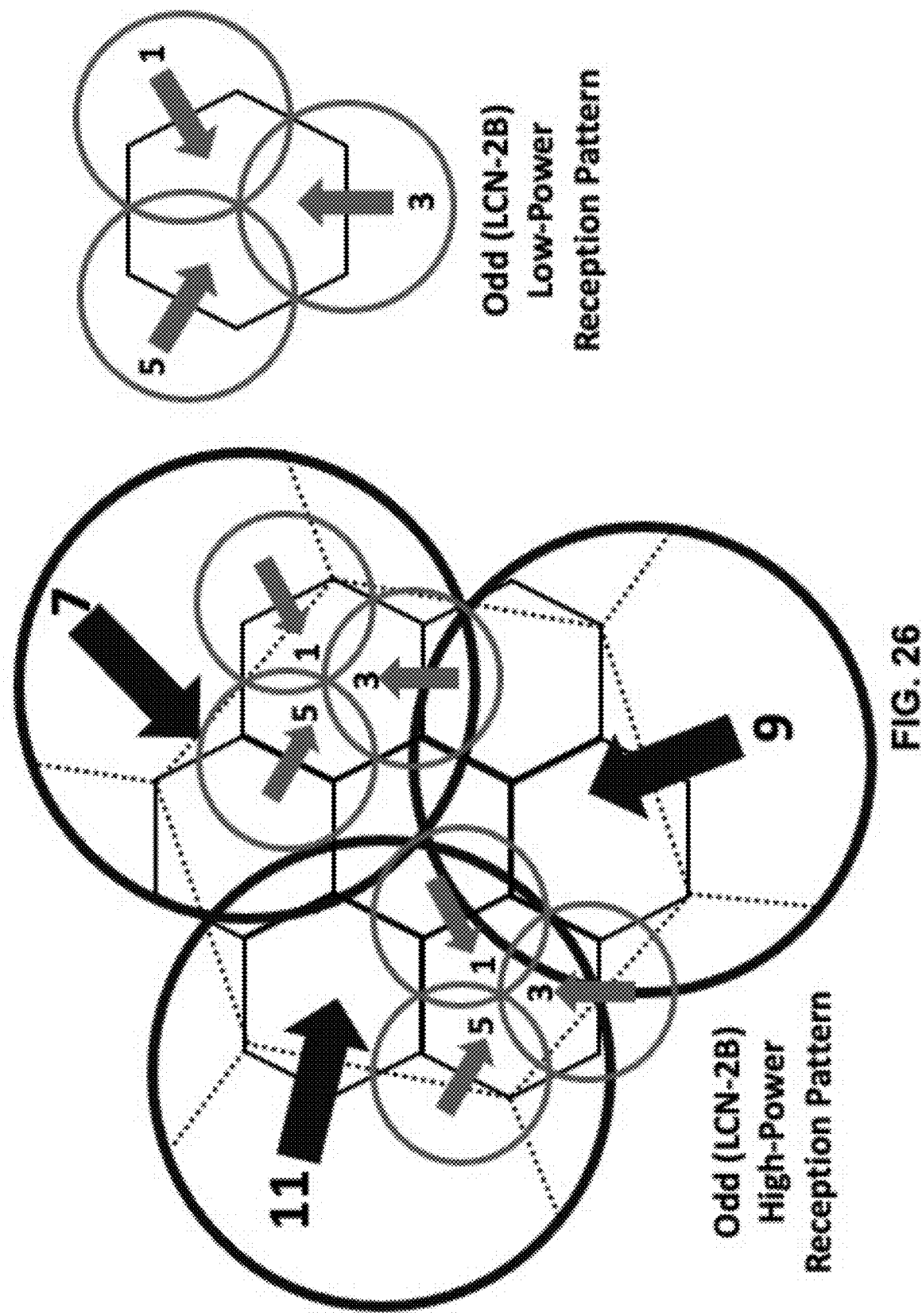
Figure 27:
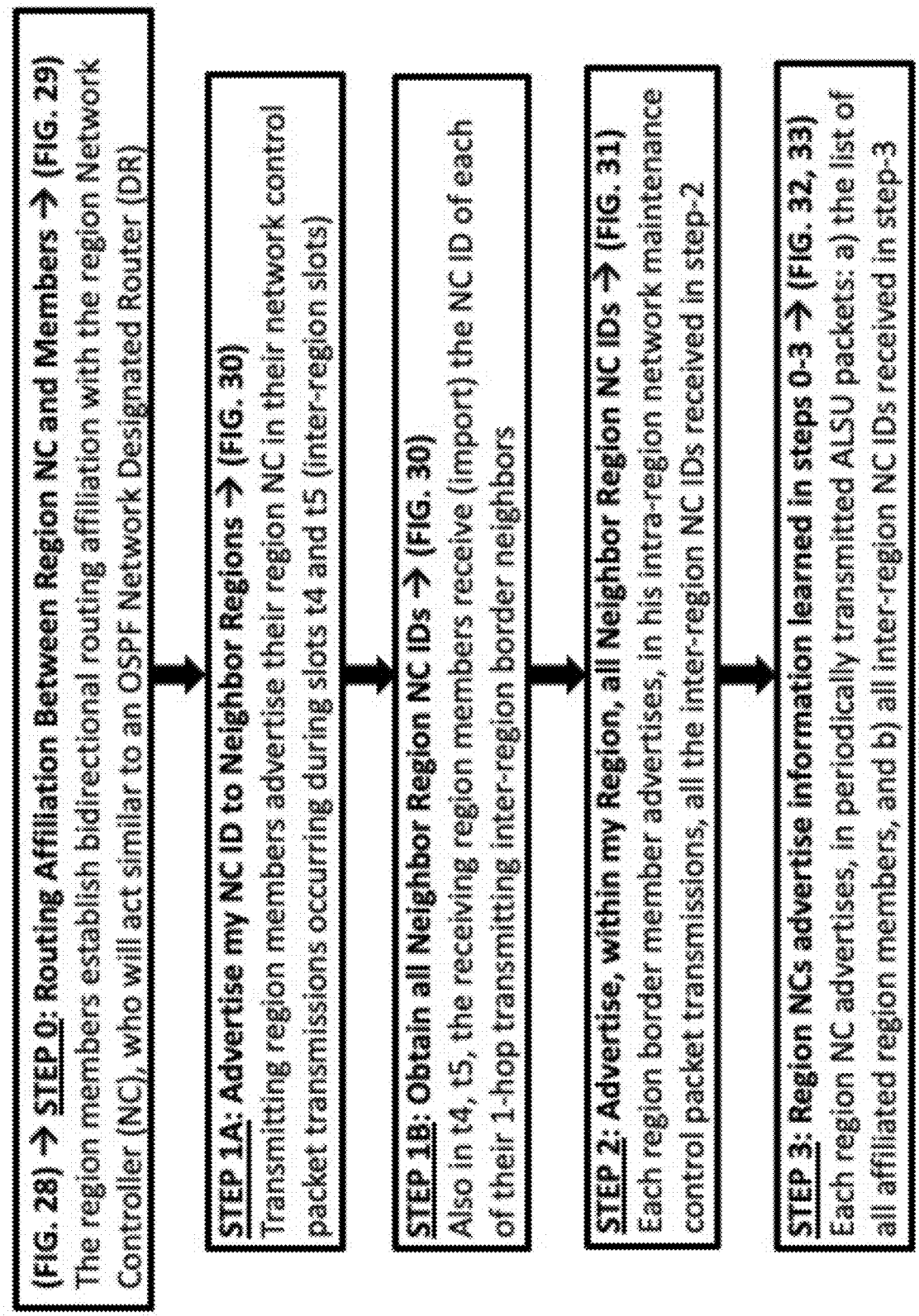
FIGS. 27-33 illustrate how the inter-region data routing mechanism is implemented on top of the dynamic, density-aware, dual-tier CAF, in accordance with an embodiment of the disclosed method.
Figure 28:
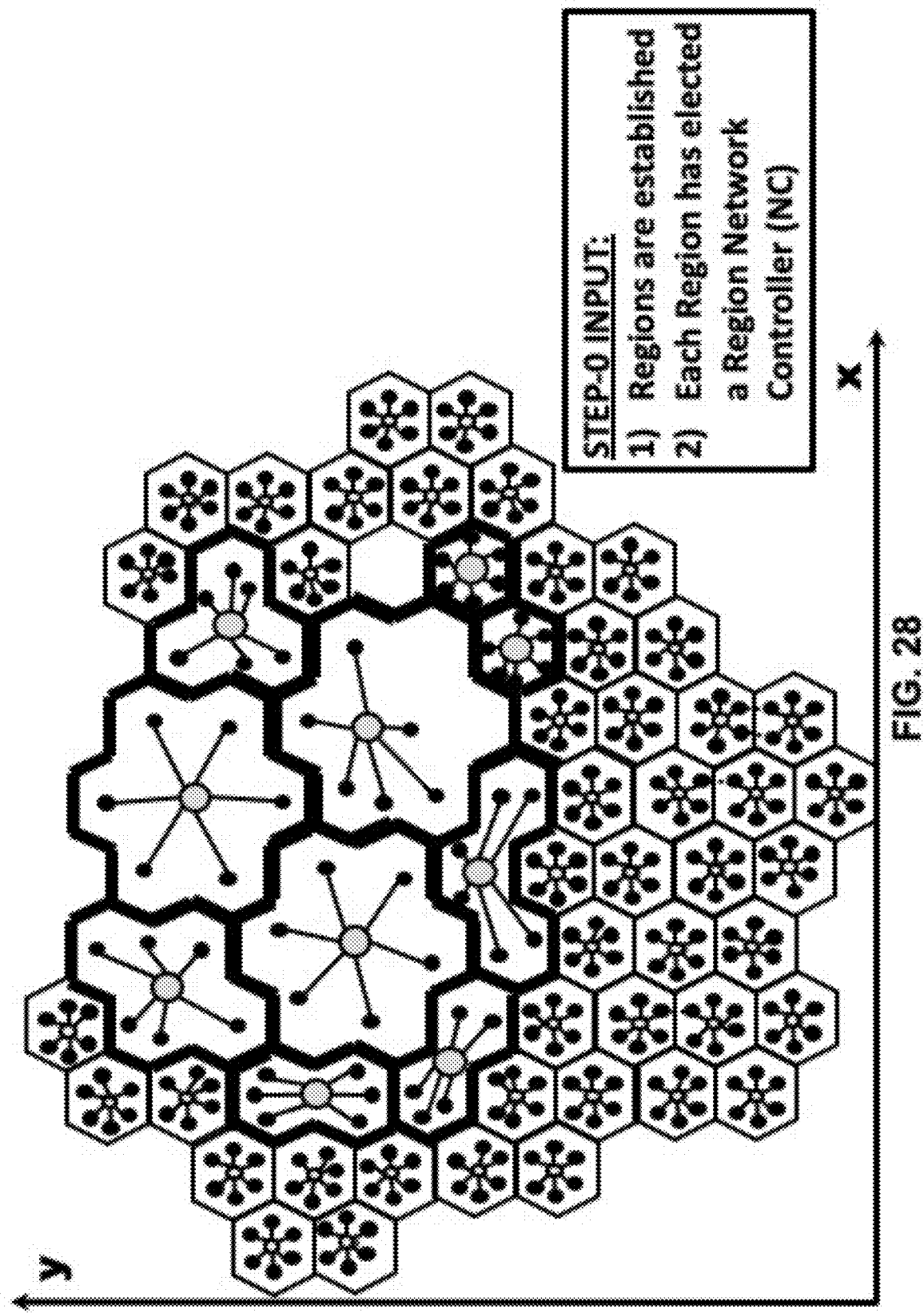
Figure 29:
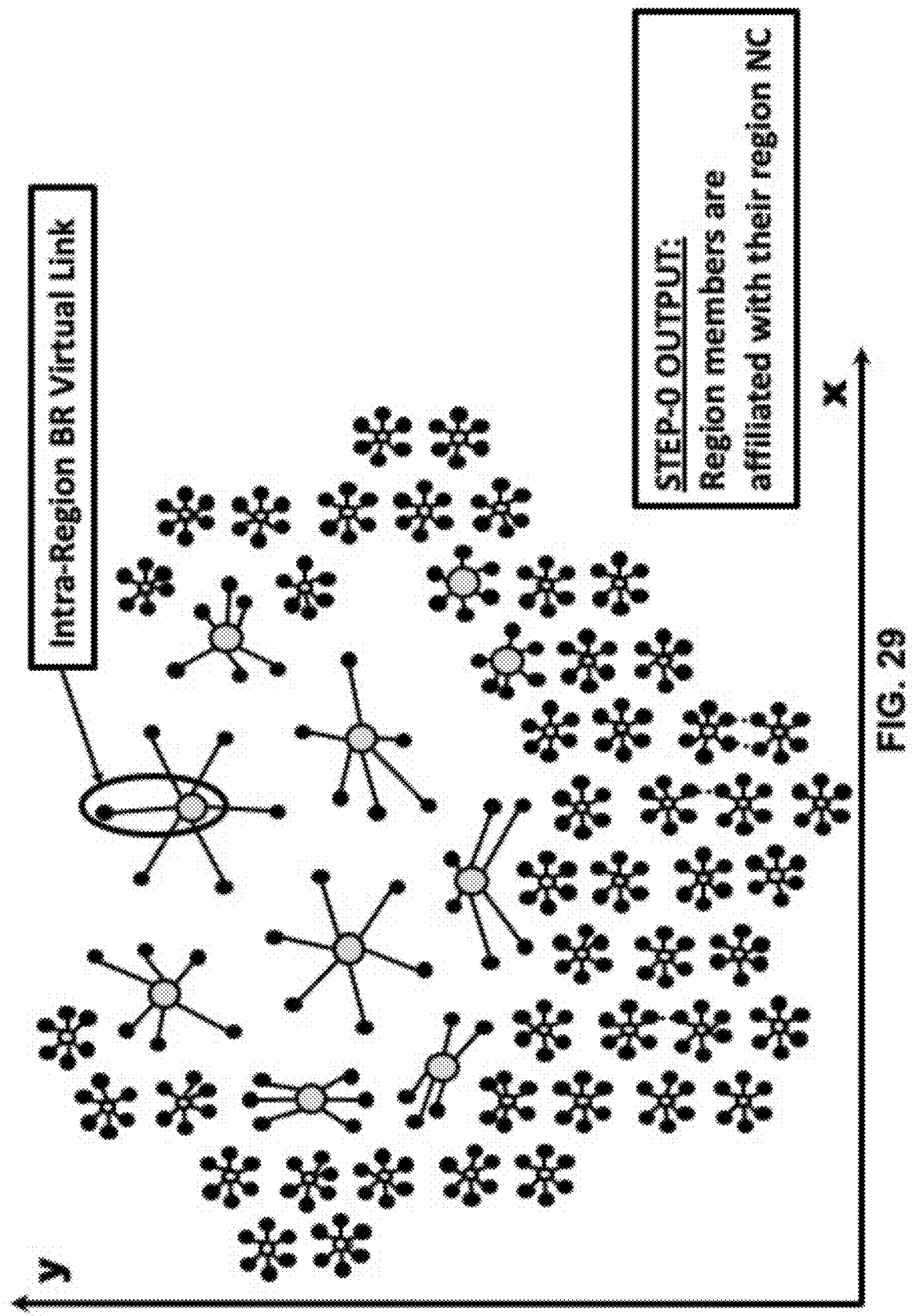
Figure 30:
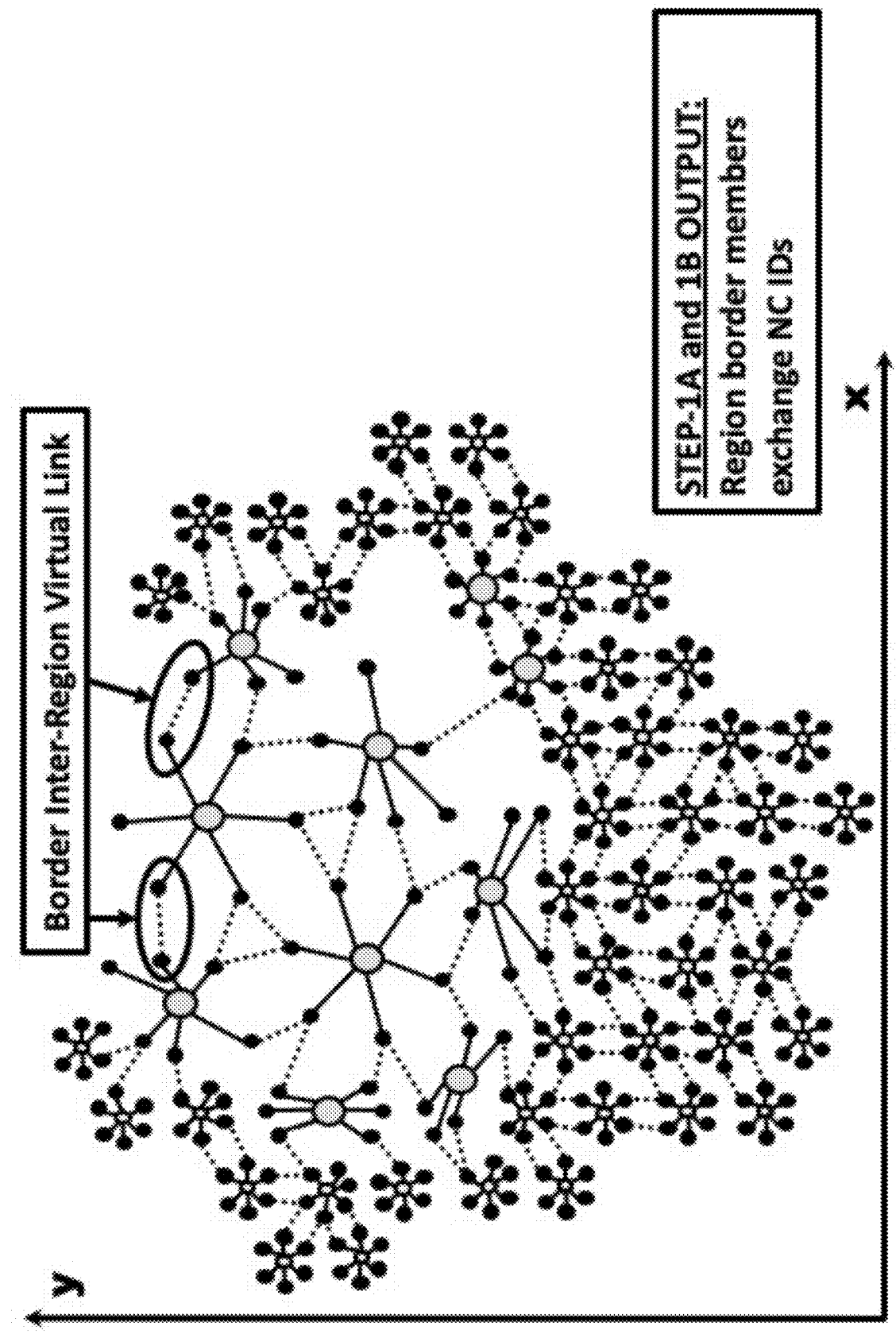
Figure 31:
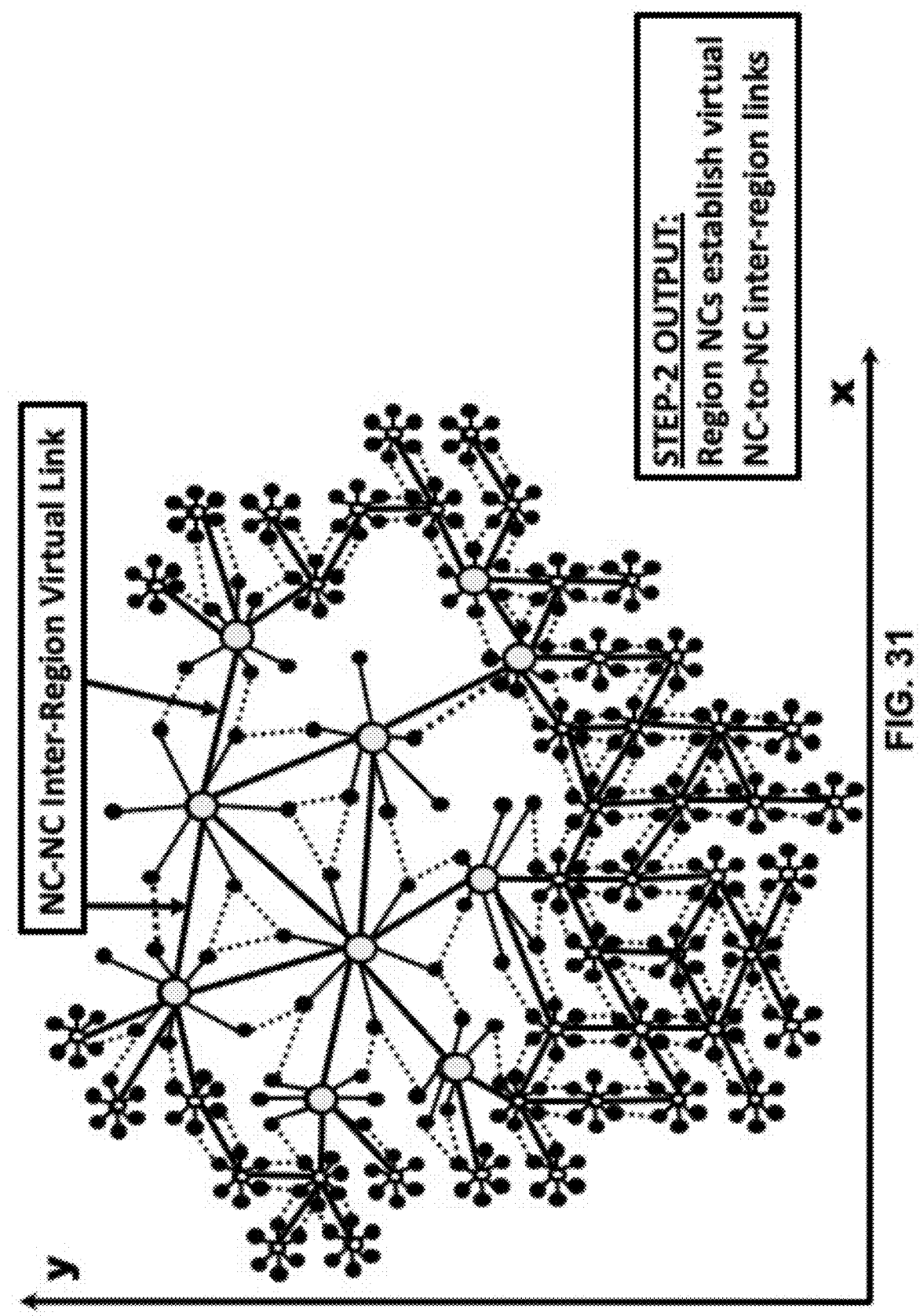
Figure 32:
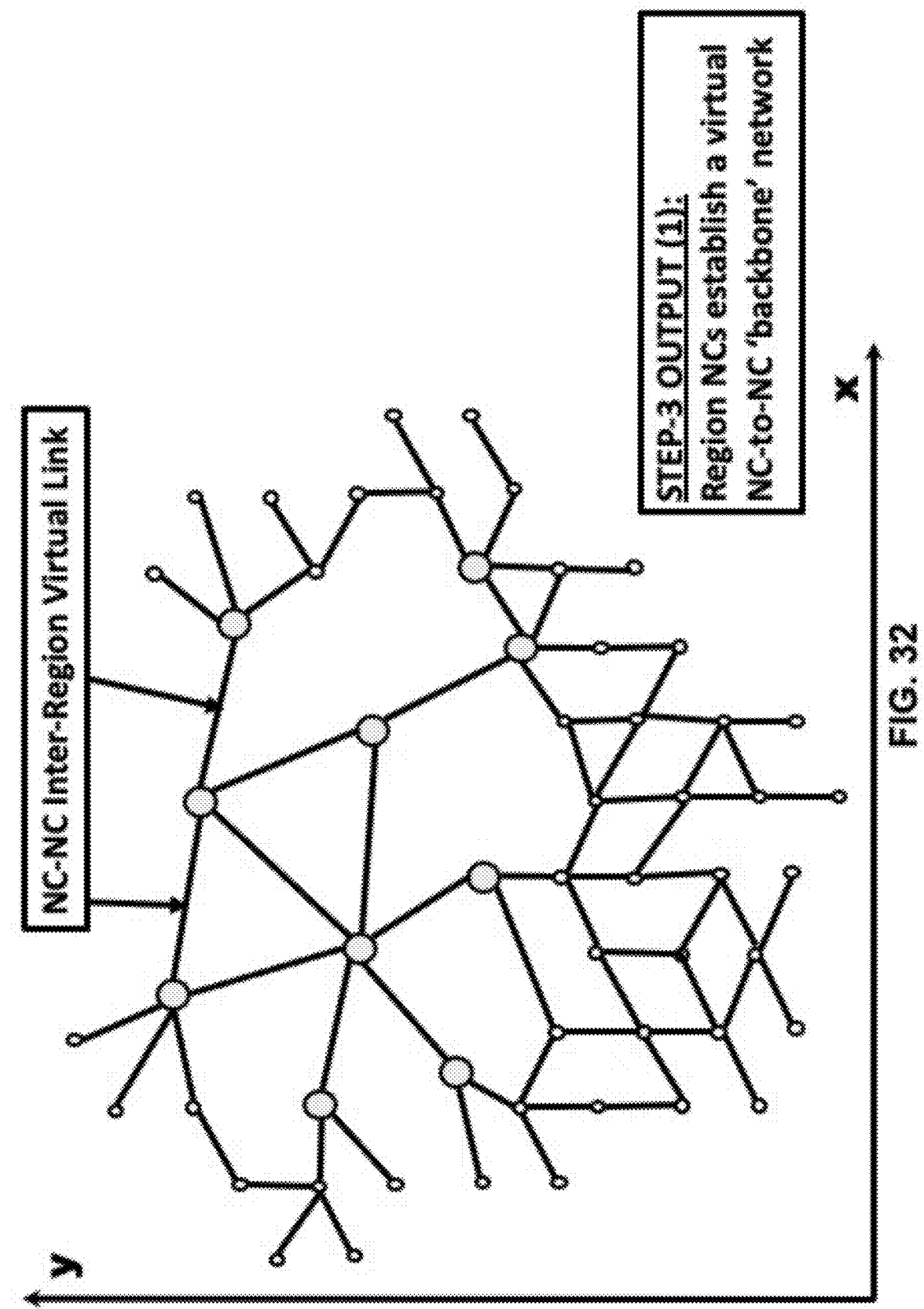
Figure 33:
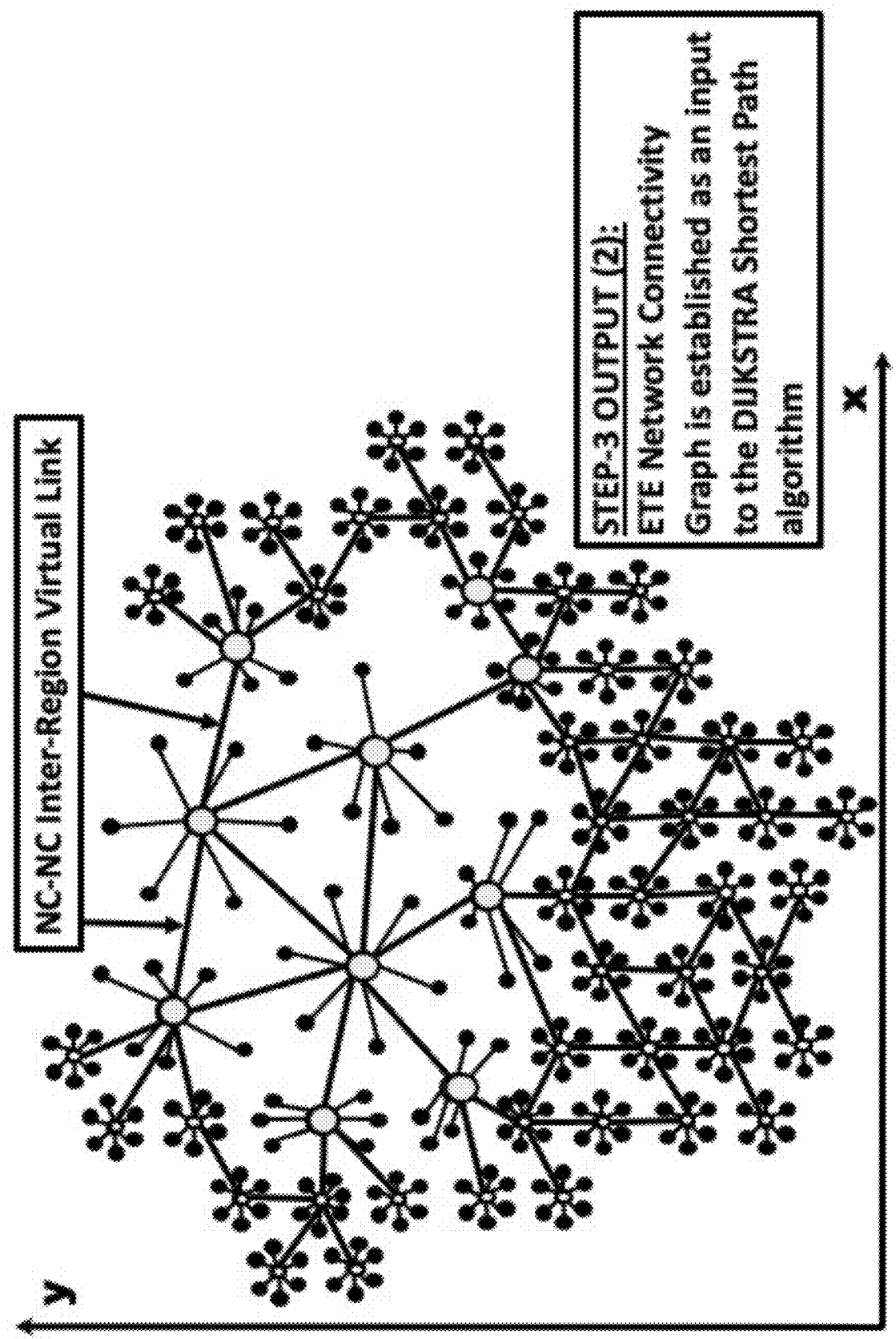

FIG. 23-26 illustrate various transmission interference patterns that result from using a dynamic, density-aware, dual-tier CAF, in accordance with an embodiment of the disclosed method. Due to the parallel usage (as shown in FIGS. 21, 22) of two CAF tiers (i.e., DLP CAF[0] tier, and SHP CAF[1] tier), certain areas in certain regions, especially in network areas where the node density starts to change from dense to sparse, will simultaneously fall within transmission range of two different transmitter pools: a) a first, low-power transmitter pool that operates using the DLP CAF[0] tier, and b) a second, high-power transmitter pool that operates using the SHP CAF[1] tier. In particular:
- a) FIG. 23 shows the even-oriented (LCN-2A) transmission interference pattern experienced by nodes located within the center cell of a level[1] region.
- b) FIG. 24 shows the even-oriented (LCN-2A) transmission interference pattern experienced by nodes located within the outer (edge) cells of a level[1] region.
- c) FIG. 25 shows the odd-oriented (LCN-2B) transmission interference pattern experienced by nodes located within the center cell of a level[1] region.
- d) FIG. 26 shows the odd-oriented (LCN-2B) transmission interference pattern experienced by nodes located within the outer (edge) cells of a level[1] region.

With reference to FIG. 23-26, through the periodically transmitted node Hello packets (which are part of a constantly running network maintenance control process), the nodes in each region become aware of all their one-hop neighbors from each of the geographically adjacent regions; in addition to other information, each Hello packet contains a data field indicating the current CAF (i.e., 0 or 1, in this embodiment) that the hello packet originator is currently using, as well as the future CAF that the hello packet originator will be using a predetermined number of frames from now, and the number of frames before a potential CAF transition occurs.

Based on the above, constantly updated knowledge, the region node population is dynamically split into a transmitter pool and a receiver pool, wherein the receiver pool is potentially split into multiple receiver sub-pools, such that one receiver sub-pool is assigned for each of the CAFs used by the neighboring regions. For example, if a region is only surrounded by regions that are all using the same level[0] DLP CAF, or the same level[1] SHP CAF, then the region receiver pool does not need to be further split into sub-pools, because, in a given inter-region slot, each receiving node in the receiver pool will only be within transmission range of transmit nodes that are all using the same transmit channel.

However, if some of the neighbor regions surrounding the 'local' region are dense, and are using the level[0] DLP CAF, and some of the neighbor regions are sparse, and are using the level[1] SHP CAF, then depending on the particular direction in which this CAF overlap is occurring, some subset of nodes in the receiver pool may find themselves within transmission range of transmit nodes that are using two different transmit channels, in accordance with (IAW) with their selected CAF and associated transmit power level; in that case, the subset of the receiver pool that finds itself within range of two different overlapping transmitter pools will have to be further split into two receiver sub-pools, wherein the nodes in the first receiver sub-pool are assigned to receive from the first transmitter pool, and the nodes in the second receiver sub-pool are assigned to receive from the second transmitter pool.

With continuing reference to FIG. 23-26, taking all of the above into account, the following events occur during the inter-region phase:
- a) During both LCN-2A and LCN-2B, each node in the region transmitter pool transmits (twice) the data packets that have been fully flooded to the entire region population up until the end of the most recently completed intra-region epoch, using the channel assigned by the currently selected tier CAF to the cell in which the transmitter pool is located.
- b) During inter-region slot t4 (LCN-2A), each node in a region receiver sub-pool receives the data packets being transmitted by one of the two following transmitter pools: 1) the first transmitter pool that is located within a level[0] 'even-oriented' neighbor region (i.e.,), using the channel assigned to the first transmitter pool by CAF[0], or 2) the second transmitter pool that is located within a level[1] 'even-oriented' neighbor region (i.e.,), using the channel assigned to the second transmitter pool by CAF[1].
- c) During inter-region slot t5 (LCN-2B), each node in a region receiver sub-pool receives the data packets being transmitted by one of the two following transmitter pools: 1) the first transmitter pool that is located within a level[0] 'odd-oriented' neighbor region (i.e.,), using the channel assigned to the first transmitter pool by CAF[0], or 2) the second transmitter pool that is located within a level[1] 'odd-oriented' neighbor region (i.e.,), using the channel assigned to the second transmitter pool by CAF[1].

Transmitter/Receiver Pool Selection/Splitting for Overlapping Reception Areas

Obviously, when a low-power reception pattern overlaps with a high-power reception pattern within a particular region (as shown in FIGS. 23-26), the distributed TRPS algorithm will have to split the region receiver pool (for the impacted region area only) into 2 receiver sub-pools: a) one receiver sub-pool allocated to the low-power transmitter pool that is using one of the DLP channels 1-3, and b) one receiver sub-pool allocated to the high-power transmitter pool that is using one of the SHP channels 4-6.

The splitting of the region's receiver pool subset that is located within the affected region area (i.e., the region area that falls within transmission range of both a high-power and a low-power transmitter pool) can be done in a number of ways, in order to ensure that there is at least one 'good' (i.e., high reception probability) receiver in each receiver sub-pool. For example:
- a) the affected area receiver pool could be split in half, with each of the two receiving sub-pools containing approximately the same number of receivers, or
- b) alternatively, since the nodes have detailed knowledge of their 1-hop neighbor connectivity (obtained through the periodically transmitted node Hello packets), the TRPS algorithm could decide to allocate just 1 (but no more than 2) receiver(s) to the second receiver sub-pool, or
- c) if the receiver pool in the affected region area is too 'thin' (i.e., very low number of receivers) to be split into 2 sub-pools, the TRPS algorithm may decide to 'steal' some local nodes from the transmitter pool, and turn them into receivers; in that case, the TRPS algorithm may elect to do a 33/33/33 percent split between the affected region area's a) transmitter pool, b) low-power receiver sub-pool, and c) high-power receiver sub-pool, or d) if the number of receivers in the affected area is so small that it would not be feasible to sub-divide them into two sub-pools, then the TRPS algorithm may simply elect to not split the receiver pool, and receive from only one of the two overlapping transmitter pools.

FIG. 27-33 illustrate how the inter-region data routing mechanism is implemented on top of the dynamic, density-aware, dual-tier CAF, in accordance with an embodiment of the disclosed method.

With reference to FIG. 27-33, as part of the overall network maintenance process, each node in a region periodically transmits Hello packets in order to perform network maintenance tasks such as 1-hop and 2-hop neighbor discovery, link status evaluation, and also to periodically announce their position/location coordinates to the rest of the region. The Hello packets can be configured to have a hop-based Time-to-Live (TTL) field, or a geographic-based Distance-to-Live (DTL) field, which determine how far away from the originating node each Hello packet is propagated. In addition, each Hello packet contains the current location coordinates of the originating node. The inter-region routing mechanism works as follows:

a) STEP-0: Every region acts as an independent layer-2 subnet (like an Ethernet), with its own (region) NC acting like an OSPF Type-2 Network LSA Designated Router. Region members establish bidirectional routing affiliations with their region NC.

b) STEP-1A: During LCN-2 (i.e., inter-region slots t4, t5), the transmitting region members advertise (in their inter-region network maintenance control packets) their affiliated NC ID to their 1-hop receiving inter-region border neighbors, and (STEP-1B) the receiving region members receive, from their 1-hop transmitting inter-region border neighbors, the NC ID that the inter-region border neighbors are affiliated with.

c) STEP-2: During LCN-1 (i.e., intra-region slots t1, t2, t3), the inter-region receiving members advertise (in their intra-region network maintenance control packets) all the NC IDs that they received/learned from their 1-hop transmitting inter-region border neighbors; through this step, the region NC becomes aware of all the neighboring region NC IDs that are reachable. This process is occurring simultaneously throughout all regions.

d) STEP-3: Each region NC constructs, with a predetermined frequency, an ALSU packet containing: a) the affiliated intra-region member IDs, and b) the NC IDs of all the reachable neighbor region NCs that were learned during the prior steps.

The ALSU packets have a predetermined geographic dissemination radius (Distance-to-Live, or DTL) relative to the location of the originating NC, similar to the TTL (Time-to-Live) field commonly used in traditional IP-based networks; the TTL field gets decremented with every traversed IP hop; the DTL field value is compared against the geographic distance of the current forwarding node from the ALSU source; if the distance is less than the DTL value then the ALSU packet is forwarded one more hop, otherwise the ALSU packet is not propagated any further. But, if the ALSU packets have a finite DTL value, then the question that arises is how do remote nodes that are located very far from a particular destination node know how to route packets to the particular destination node? The answer is by repeatedly applying the concept of geographic link abstraction to links that are connecting progressively larger geographic areas.

The ALSU packets generated by the individual region NCs represent the first (lowest) level of geographic link abstraction: ALSU[1] packets contain type[1] links, are being generated with a frequency f[1], by DR[1] nodes (i.e., level[1] DR nodes), and have a predetermined DTL[1] geographic dissemination radius.

If we hierarchically repeat application of the above concept, we get the following geographic link abstraction rule: ALSU[k] packets contain type[k] links, are being generated with a frequency f[k], by DR[k] nodes (i.e., level[k] DR nodes), and have a predetermined DTL[k] geographic dissemination radius, wherein: a) a type[k] link is a virtual 'mesh' link providing multi-hop connectivity between two DR[k−1] nodes, b) f(k)<f(k−1), c) DTL(k)>DTL(k−1), and d) the DR[k−1] nodes elect a DR[k] node and establish bidirectional routing affiliations with the elected DR[k] node. Regarding the hierarchical DR election process, one possible rule is to elect one DR[k] node within each level[k] tile (i.e., super-cell[k]), where a level[k] tile (i.e., super-cell [k]) consists of a 'center' level[k−1] tile (i.e., super-cell[k−1]) surrounded by 6 'edge' level[k−1] tiles (see FIG. 34). Furthermore, in order to provide multicast support, the ALSU[k] packets generated by each elected DR[k] node will contain the Multicast Groups (MCGs) that his affiliated DR[k−1] nodes are registered to receive.

Figure 35:
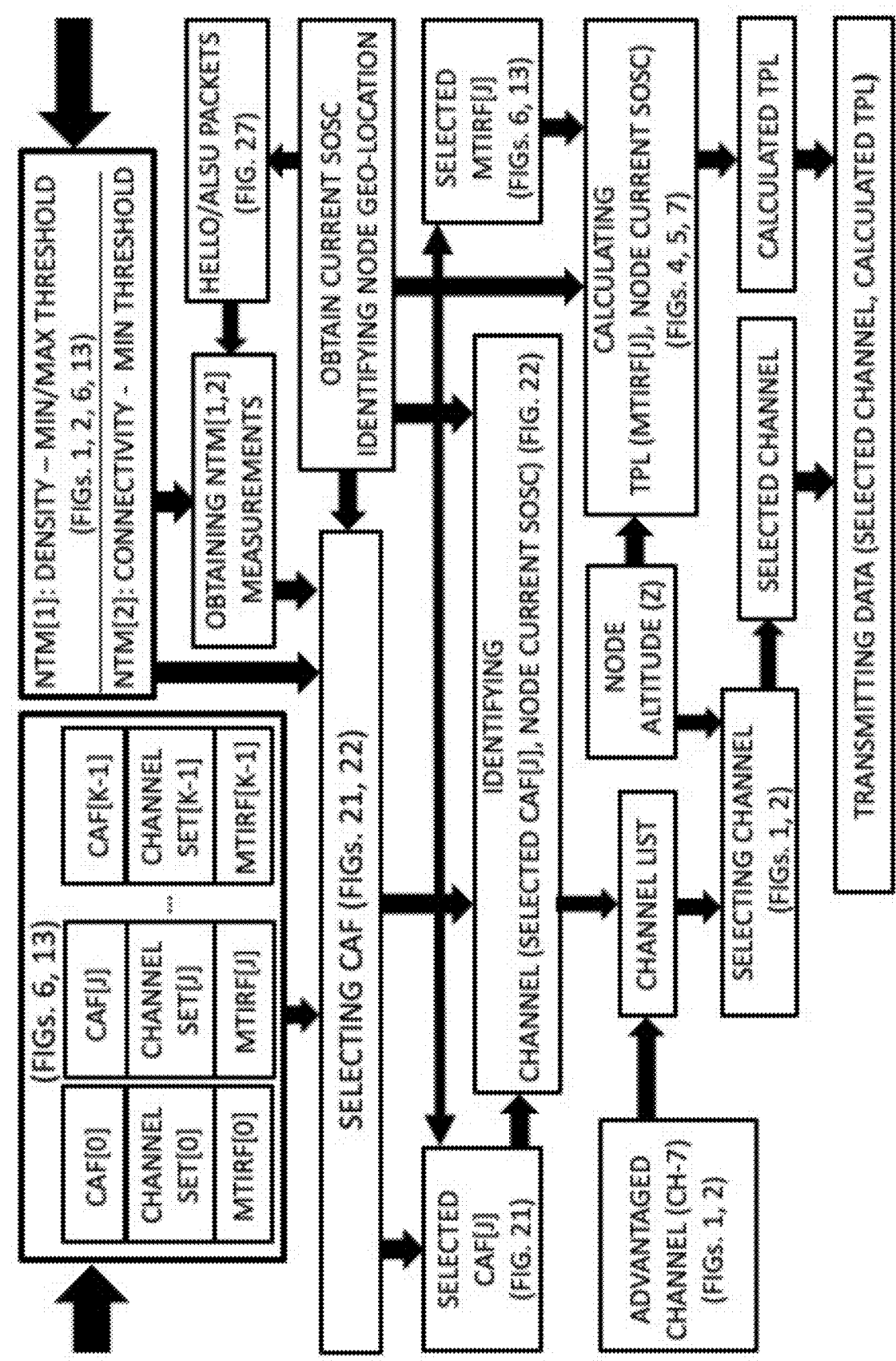
FIG. 35 is a flow-chart illustrating the steps making up the claimed method, and the particular manner in which the method's data inputs, outputs (intermediate and final), and functional steps are combined to produce the claimed method.

Finally, FIG. 35 is a flow-chart illustrating the steps making up the claimed method, and the particular manner in which the method's data inputs, outputs (intermediate and final), and functional steps are combined to produce the claimed method.

It should be noted that all the generated Hello and ALSU packets contain the most current location coordinates of the originating node, and in the case of ALSU packets, they also contain the most recent location coordinates of every affiliated node member that they are advertising. The combined information included in all the received Hello and ALSU packets is used by the distributed region formation algorithm that is running on every network node.

FIG. 34 illustrates a hierarchical geographic tiling pattern based on the tessellation properties of the hexagonal cell. Due to the geometrical properties of the hexagonal cell, the currently disclosed dual Channel Assignment Function approach can be extended to multiple levels, wherein each level k has its own: a) CAF[K] based on the size/shape of cell[k], b) channel-set [k] consisting of 3 unique channels, and c) MTIR [k] tailored to the dimensions of cell[k]. This can be applicable depending on how many channels are available, and the available transmitting power throughout the network.

It should be noted that while the presented embodiment is using Barrage Relaying coordinated through a NC as the region MAC layer mechanism, the operation of the claimed method, and software application, is not limited exclusively to Barrage Relaying; other TDMA MAC layer protocols can be used instead, such as the USAP (Unified Slot Assignment Protocol) timeslot allocation protocol.

Also, the structure of the TDMA frame can vary from the one disclosed by the presented embodiment; for example, the number of intra-region timeslots allocated to LCN-1 is not limited to 3, and the number of inter-region timeslots allocated to LNC-2 is not limited to 2. In particular, LCN-2 could be allocated 3 timeslots such that the nodes in a cellular region are within range of only 2 simultaneous neighboring transmissions, instead of 3 (as shown in the preferred embodiment); the benefit of using 3 LCN-2 timeslots is that transmitting nodes could have a larger transmission interference range since there would be only 2 simultaneous transmissions overlapping in a cell region, as opposed to 3 in the presented embodiment.

Also, the shape of the cell does not have to be hexagonal, even though the hexagonal shape is a better geometric fit for a circular transmission radius pattern.

Additionally, another way of implementing a multi-tier channel assignment function could be time-slot based, based on the relative breakdown of traffic according to the number and geographical distribution of the traffic destinations. According to this approach, each CAF[k] is allocated its own TDMA Logical Channel Number (LCN[k]) according to a preconfigured set of relative weights; for example, LCN[k], CAF[k], and MTIR[k] are used for the transmission of packets that have an intended geographic distribution radius[k] (i.e., Distance-to-Live[k]). Under this approach, nodes have separate queues for each DTL value, and queue the arriving packets on separate LCN queues based on how far the packet still has to go to reach all its remaining destinations; during LCN[k], all the nodes in a region switch to the CAF[k] parameter set, and form a BRN that has a Network Diameter proportional to the cell[k] dimensions and MTIRI[k] values.

What is claimed is:

1. A method performed by each node from a plurality of nodes configured to communicate using a time division multiple access (TDMA) wireless communication network and based upon a TDMA frame including a plurality of timeslots, wherein each of said timeslots is identified by a periodic timeslot sequence identifier (PTSI), the method comprising:

obtaining a plurality of K Channel Assignment Functions (CAFs), wherein: 1) K is an integer greater than or equal to 2, and J is an integer ranging from 0 to K-1, and 2) the J-th CAF from said plurality of K CAFs is in a one-to-one correspondence with a J-th channel set, and a J-th Maximum Transmission Interference Range Function (MTIRF), wherein 2a) the J-th CAF assigns one channel from the J-th channel set to an input set of spatial coordinates (SOSC) identifying an input geographic location, and 2b) the J-th MTIRF assigns a J-th Maximum Transmission Interference Range (MTIR) value to said input SOSC;

obtaining a set of network topology metrics (NTMs) comprising a network density metric (NDM), wherein each of said NTMs is associated with at least one threshold;

obtaining at least one measurement for each of said NTMs;

obtaining a current SOSC identifying said each node's current geographic location;

selecting a CAF from said plurality of K CAFs based, at least in part, on: 1) the current SOSC, 2) the at least one measurement for each of said NTMs, and 3) the at least one threshold associated with each of said NTMs;

selecting a channel from a list of channels comprising the channel assigned to the current SOSC by the selected CAF;

calculating a transmission power level (TPL) based, at least in part, on the MTIR value assigned to the current SOSC by the MTIRF corresponding to the selected CAF; and, transmitting data using the selected channel and the calculated TPL.

2. The method of claim 1, further wherein: 1) the J-th CAF and the J-th MTIRF are each in a one-to-one correspondence with a geographic cell of type J, 2) the J-th CAF assigns said one channel from the J-th channel set to said input SOSC based on the type J geographic cell, and 3) the J-th MTIRF assigns said J-th MTIR value to said input SOSC based on the type J geographic cell.

3. The method of claim 2, wherein the step of obtaining the at least one measurement for each of said NTMs comprises the step of obtaining the total number of nodes located within said each node's current region, wherein a region is defined as a contiguous geographic area characterized by the constraint that all nodes located within the spatial boundaries of the contiguous geographic area are transmitting data using the same channel.

4. The method of claim 3, wherein the contiguous geographic area consists of an integer multiple of type 0 geographic cells.

5. The method of claim 1, wherein the list of channels further comprises an additional channel that is different from the channels included in each of the K channel sets.

6. The method of claim 1, wherein the step of obtaining the at least one measurement for each of said NTMs comprises the step of obtaining the total number of nodes located within said each node's current region, wherein a region is defined as a contiguous geographic area characterized by the constraint that all nodes located within the spatial boundaries of the contiguous geographic area are transmitting data using the same channel.

7. The method of claim 1, wherein each channel in each of the K channel sets is one of: 1) a Time Division Multiple Access (TDMA) channel uniquely associated with a particular PTSI, 2) a Frequency Division Multiple Access (FDMA) channel, 3) a Code Division Multiple Access (CDMA) channel, or 4) a unique pseudorandom frequency-hopping sequence instructing said each node to switch to a particular frequency channel at a particular TDMA timeslot.

8. A time division multiple access (TDMA) wireless communication network comprising a plurality of wireless communication devices (WCDs), wherein: a) the TDMA network is based upon a TDMA frame including a plurality of timeslots, b) each of said timeslots is identified by a periodic timeslot sequence identifier (PTSI), and c) each of said WCDs is performing the steps of:

obtaining a plurality of K Channel Assignment Functions (CAFs), wherein: 1) K is an integer greater than or equal to 2, and J is an integer ranging from 0 to K-1, and 2) the J-th CAF from said plurality of K CAFs is in a one-to-one correspondence with a J-th channel set, and a J-th Maximum Transmission Interference Range Function (MTIRF), wherein 2a) the J-th CAF assigns one channel from the J-th channel set to an input set of spatial coordinates (SOSC) identifying an input geographic location, and 2b) the J-th MTIRF assigns a J-th Maximum Transmission Interference Range (MTIR) value to said input SOSC;

obtaining a set of network topology metrics (NTMs) comprising a network density metric (NDM), wherein each of said NTMs is associated with at least one threshold;

obtaining at least one measurement for each of said NTMs;

obtaining a current SOSC identifying said each of said WCD's current geographic location;

selecting a CAF from said plurality of K CAFs based, at least in part, on: 1) the current SOSC, 2) the at least one measurement for each of said NTMs, and 3) the at least one threshold associated with each of said NTMs;

selecting a channel from a list of channels comprising the channel assigned to the current SOSC by the selected CAF;

calculating a transmission power level (TPL) based, at least in part, on the MTIR value assigned to the current SOSC by the MTIRF corresponding to the selected CAF; and, transmitting data using the selected channel and the calculated TPL.

9. The network of claim 8, further wherein: 1) the J-th CAF and the J-th MTIRF are each in a one-to-one correspondence with a geographic cell of type J, 2) the J-th CAF assigns said one channel from the J-th channel set to said input SOSC based on the type J geographic cell, and 3) the J-th MTIRF assigns said J-th MTIR value to said input SOSC based on the type J geographic cell.

10. The network of claim 9, wherein the step of obtaining the at least one measurement for each of said NTMs comprises the step of obtaining the total number of WCDs located within said each of said WCD's current region, wherein a region is defined as a contiguous geographic area characterized by the constraint that all WCDs located within the spatial boundaries of the contiguous geographic area are transmitting data using the same channel.

11. The network of claim 10, wherein the contiguous geographic area consists of an integer multiple of type 0 geographic cells.

12. The network of claim 8, wherein the list of channels further comprises an additional channel that is different from the channels included in each of the K channel sets.

13. The network of claim 8, wherein the step of obtaining the at least one measurement for each of said NTMs comprises the step of obtaining the total number of WCDs located within said each of said WCD's current region, wherein a region is defined as a contiguous geographic area characterized by the constraint that all WCDs located within the spatial boundaries of the contiguous geographic area are transmitting data using the same channel.

14. The network of claim 8, wherein each channel in each of the K channel sets is one of: 1) a Time Division Multiple Access (TDMA) channel uniquely associated with a particular PTSI, 2) a Frequency Division Multiple Access (FDMA) channel, 3) a Code Division Multiple Access (CDMA) channel, or 4) a unique pseudorandom frequency-hopping sequence instructing said each node to switch to a particular frequency channel at a particular TDMA timeslot.

15. A wireless communication device (WCD) configured to operate in a time division multiple access (TDMA) wireless communication network, wherein: a) the TDMA network is based upon a TDMA frame including a plurality of timeslots, b) each of said timeslots is identified by a periodic timeslot sequence identifier (PTSI), and c) the WCD is performing the steps of:

obtaining a plurality of K Channel Assignment Functions (CAFs), wherein: 1) K is an integer greater than or equal to 2, and J is an integer ranging from 0 to K-1, and 2) the J-th CAF from said plurality of K CAFs is in a one-to-one correspondence with a J-th channel set, and a J-th Maximum Transmission Interference Range Function (MTIRF), wherein 2a) the J-th CAF assigns one channel from the J-th channel set to an input set of spatial coordinates (SOSC) identifying an input geographic location, and 2b) the J-th MTIRF assigns a J-th Maximum Transmission Interference Range (MTIR) value to said input SOSC;

obtaining a set of network topology metrics (NTMs) comprising a network density metric (NDM), wherein each of said NTMs is associated with at least one threshold;

obtaining at least one measurement for each of said NTMs;

obtaining a current SOSC identifying said WCD's current geographic location;

selecting a CAF from said plurality of K CAFs based, at least in part, on: 1) the current SOSC, 2) the at least one measurement for each of said NTMs, and 3) the at least one threshold associated with each of said NTMs;

selecting a channel from a list of channels comprising the channel assigned to the current SOSC by the selected CAF;

calculating a transmission power level (TPL) based, at least in part, on the MTIR value assigned to the current SOSC by the MTIRF corresponding to the selected CAF; and, transmitting data using the selected channel and the calculated TPL.

16. The WCD of claim 15, further wherein: 1) the J-th CAF and the J-th MTIRF are each in a one-to-one correspondence with a geographic cell of type J, 2) the J-th CAF assigns said one channel from the J-th channel set to said input SOSC based on the type J geographic cell, and 3) the J-th MTIRF assigns said J-th MTIR value to said input SOSC based on the type J geographic cell.

17. The WCD of claim 16, wherein the step of obtaining the at least one measurement for each of said NTMs comprises the step of obtaining the total number of WCDs located within said WCD's current region, wherein a region is defined as a contiguous geographic area characterized by the constraint that all WCDs located within the spatial boundaries of the contiguous geographic area are transmitting data using the same channel.

18. The WCD of claim 17, wherein the contiguous geographic area consists of an integer multiple of type 0 geographic cells.

19. The WCD of claim 15, wherein the list of channels further comprises an additional channel that is different from the channels included in each of the K channel sets.

20. The WCD of claim 15, wherein the step of obtaining the at least one measurement for each of said NTMs comprises the step of obtaining the total number of WCDs located within said WCD's current region, wherein a region is defined as a contiguous geographic area characterized by the constraint that all WCDs located within the spatial boundaries of the contiguous geographic area are transmitting data using the same channel.

21. The WCD of claim 15, wherein each channel in each of the K channel sets is one of: 1) a Time Division Multiple Access (TDMA) channel uniquely associated with a particular PTSI, 2) a Frequency Division Multiple Access (FDMA) channel, 3) a Code Division Multiple Access (CDMA) channel, or 4) a unique pseudorandom frequency-hopping sequence instructing said each node to switch to a particular frequency channel at a particular TDMA timeslot.

22. A non-transitory computer readable storage medium having stored thereon a set of processor-executable software instructions executable by a processor in a wireless communication device (WCD), wherein: a) the WCD is configured to operate in a time division multiple access (TDMA) wireless communication network, b) the TDMA network is based upon a TDMA frame including a plurality of timeslots, c) each of said timeslots is identified by a periodic timeslot sequence identifier (PTSI), and d) the set of processor-executable software instructions causes the processor in the WCD to perform the steps of:

obtaining a plurality of K Channel Assignment Functions (CAFs), wherein: 1) K is an integer greater than or equal to 2, and J is an integer ranging from 0 to K-1, and 2) the J-th CAF from said plurality of K CAFs is in a one-to-one correspondence with a J-th channel set, and a J-th Maximum Transmission Interference Range Function (MTIRF), wherein 2a) the J-th CAF assigns one channel from the J-th channel set to an input set of spatial coordinates (SOSC) identifying an input geographic location, and 2b) the J-th MTIRF assigns a J-th Maximum Transmission Interference Range (MTIR) value to said input SOSC;

obtaining a set of network topology metrics (NTMs) comprising a network density metric (NDM), wherein each of said NTMs is associated with at least one threshold;

obtaining at least one measurement for each of said NTMs;

obtaining a current SOSC identifying said WCD's current geographic location;

selecting a CAF from said plurality of K CAFs based, at least in part, on: 1) the current SOSC, 2) the at least one measurement for each of said NTMs, and 3) the at least one threshold associated with each of said NTMs;

selecting a channel from a list of channels comprising the channel assigned to the current SOSC by the selected CAF;

calculating a transmission power level (TPL) based, at least in part, on the MTIR value assigned to the current SOSC by the MTIRF corresponding to the selected CAF; and, transmitting data using the selected channel and the calculated TPL.

23. The computer readable storage medium of claim 22, further wherein: 1) the J-th CAF and the J-th MTIRF are each in a one-to-one correspondence with a geographic cell of type J, 2) the J-th CAF assigns said one channel from the J-th channel set to said input SOSC based on the type J geographic cell, and 3) the J-th MTIRF assigns said J-th MTIR value to said input SOSC based on the type J geographic cell.

24. The computer readable storage medium of claim 23, wherein the step of obtaining the at least one measurement for each of said NTMs comprises the step of obtaining the total number of WCDs located within said WCD's current region, wherein a region is defined as a contiguous geographic area characterized by the constraint that all WCDs located within the spatial boundaries of the contiguous geographic area are transmitting data using the same channel.

25. The computer readable storage medium of claim 24, wherein the contiguous geographic area consists of an integer multiple of type 0 geographic cells.

26. The computer readable storage medium of claim 22, wherein the list of channels further comprises an additional channel that is different from the channels included in each of the K channel sets.

27. The computer readable storage medium of claim 22, wherein the step of obtaining the at least one measurement for each of said NTMs comprises the step of obtaining the total number of WCDs located within said WCD's current region, wherein a region is defined as a contiguous geographic area characterized by the constraint that all WCDs located within the spatial boundaries of the contiguous geographic area are transmitting data using the same channel.

28. The computer readable storage medium of claim 22, wherein each channel in each of the K channel sets is one of: 1) a Time Division Multiple Access (TDMA) channel uniquely associated with a particular PTSI, 2) a Frequency Division Multiple Access (FDMA) channel, 3) a Code Division Multiple Access (CDMA) channel, or 4) a unique pseudorandom frequency-hopping sequence instructing said each node to switch to a particular frequency channel at a particular TDMA timeslot.

\* \* \* \* \*